US008254469B2

(12) United States Patent
Au et al.

(10) Patent No.: US 8,254,469 B2
(45) Date of Patent: Aug. 28, 2012

(54) ERROR CONCEALMENT FOR FRAME LOSS IN MULTIPLE DESCRIPTION CODING

(75) Inventors: Oscar Chi Lim Au, Hong Kong (CN); Mengyao Ma, Hong Kong (CN)

(73) Assignee: Kiu Sha Management Liability Company, Wilmington, DE (US)

( * ) Notice: Subject to any disclaimer, the term of this patent is extended or adjusted under 35 U.S.C. 154(b) by 1148 days.

(21) Appl. No.: 12/116,731

(22) Filed: May 7, 2008

(65) Prior Publication Data

US 2009/0279615 A1 Nov. 12, 2009

(51) Int. Cl.
*H04B 1/66* (2006.01)
*H04N 7/12* (2006.01)
*H04N 11/02* (2006.01)
*H04N 11/04* (2006.01)

(52) U.S. Cl. .................................. 375/240.27
(58) Field of Classification Search .................. None
See application file for complete search history.

(56) References Cited

U.S. PATENT DOCUMENTS

| | | | |
|---|---|---|---|
| 2004/0076332 A1* | 4/2004 | Lin et al. | 382/236 |
| 2005/0207497 A1* | 9/2005 | Rovati et al. | 375/240.16 |
| 2006/0088107 A1* | 4/2006 | Cancemi et al. | 375/240.27 |
| 2006/0104365 A1* | 5/2006 | Li et al. | 375/240.27 |
| 2006/0109901 A1* | 5/2006 | Ye et al. | 375/240.08 |
| 2006/0268166 A1* | 11/2006 | Bossen et al. | 348/390.1 |
| 2008/0080623 A1* | 4/2008 | Kim et al. | 375/240.27 |
| 2008/0232478 A1* | 9/2008 | Teng et al. | 375/240.27 |
| 2008/0298470 A1* | 12/2008 | Boyce et al. | 375/240.27 |
| 2009/0067505 A1* | 3/2009 | Tourapis et al. | 375/240.16 |
| 2009/0175387 A1* | 7/2009 | Park et al. | 375/340 |
| 2009/0225832 A1* | 9/2009 | Gomila et al. | 375/240.12 |
| 2010/0033622 A1* | 2/2010 | Bellers et al. | 348/448 |

OTHER PUBLICATIONS

Mualla et al., "Multiple-Reference Temporal Error Concealment", 2001, IEEE, pp. 149-152.*
Song et al., "Efficient Multi-Hypothesis Error Concealment Technique for H.264", 2007, IEEE, pp. 973-976.*
Kung et al., "Multi-Hypothesis Motion Compensated Prediction (MHMCP) for Error-Resilient Visual Communication", Oct. 2004, Proceedings of 2004 International Symposium on Intelligent Multimedia, Video and Speech Processing, pp. 45-48.*
Kung et al., "Analysis of Multi-Hypothesis Motion Compensated Prediction for Robust Video Transmission", 2004, IEEE, pp. 761-764.*

(Continued)

*Primary Examiner* — Ayaz Sheikh
*Assistant Examiner* — Peter Chau
(74) *Attorney, Agent, or Firm* — Turocy & Watson, LLP

(57) ABSTRACT

Systems and methodologies for concealing frame loss in a video transmission environment are provided herein. Multiple Description Coding (MDC) can be used as an Error Resilience technique for video coding. In case of transmission errors, Error Concealment can be combined with MDC to reconstruct a lost frame, such that the propagated error to following frames can be reduced. Further, multi-hypothesis decoding can be employed to enhance reconstructed video quality of MDC over packet loss networks. For instance, one or more frames after the lost frame in the same stream can be reconstructed using multi-hypothesis decoding, which combines directly decoding and temporally interpolating these frames. Moreover, output obtained from directly decoding and temporally interpolating each frame can be combined by generating a weighted sum of these hypotheses. Constant weights and/or adaptive weights (e.g., determined based on the minimum mean square error criterion) can be used for yielding the weighted sum.

18 Claims, 16 Drawing Sheets

OTHER PUBLICATIONS

Tsai et al., "H.264 Error Resilience Coding based on Multi-Hypothesis Motion Compensated Prediction and Adaptive Intra-Refresh", 2006, Proceedings of the 2006 International Conference on Inteligent Information Hiding and Multimedia Signal Processing.*

Tsai et al., "H.264 Error Resilience Coding based on Multihypothesis Motion Compensated Prediction", 2005, IEEE.*

Park et al., "Multi-Hypothesis Error Concealment Algorithm for H.26L Video", 2003, IEEE, pp. 465-468.*

Chong et al., "A Partitioned Linear Minimum Mean Square Estimator for Error Concealment", 2005, IEEE, pp. 2659-2662.*

Lin et al., "Error Resilience Property of Multihypothesis Motion-Compensated Prediction", 2002, IEEE, pp. 545-548.*

Ma et al., "A New Motion Compensation Approach for Error Resilient Video Coding", 2005, IEEE.*

Zhang et al., "Efficient Error Recovery for Multiple Description Video Coding", 2004, IEEE, pp. 829-832.*

Wang, et al., "Error control and concealment for video communication: a review," in Proc. IEEE, May 1998, pp. 974-997.

Mei, et al., "Joint forward error correction and error concealment for compressed video," in Proc. IEEE ITCC, Apr. 2002, pp. 410-415.

Fu et al.,"Efficient post-compression error-resilient 3D-scalable video transmission for packet erasure channels," in Proc. IEEE ICASSP, Mar. 2005, pp. 305-308.

Wang et al.,"Multiple description coding for video delivery," in Proc. IEEE, Jan. 2005, pp. 57-70.

Apostolopoulos, "Reliable video communication over lossy packet networks using multiple state encoding and path diversity," in Proc. SPIE VCIP, Jan. 2001, pp. 392-409.

Tang et al., "Unidirectional motion compensated temporal interpolation," in Proc. IEEE ISCAS, Jun. 1997, pp. 1444-1447.

Wong et al., "Fast motion compensated temporal interpolation for video," in Proc. SPIE VCIP, May 1995, pp. 1108-1118.

Farber et al., "Analysis of error propagation in hybrid video coding with application to error resilience," in Proc. IEEE ICIP, Oct. 1999, pp. 550-554.

Girod et al.,"Wireless video," in Compressed Video Over Networks, M.-T. Sun and A. R. Reibman, Eds. Marcel Dekker, 2000.

Wang et al., "Multiple description image coding for noisy channels by pairing transform coefficients," in IEEE MMSP, Jun. 1997, pp. 419-424.

Wang and Zhu, "Error control and concealment for video communication: a review," in Proc. IEEE, May 1998, pp. 974-997.

Lynch, and Tho, "Joint forward error correction and error concealment for compressed video," in Proc. IEEE ITCC, Apr. 2002, pp. 410-441.

Fu, "Efficient post-compression error-resilient 3D-scalable video transmission for packet erasure channels," in Proc. IEEE ICASSP, Mar. 2005, pp. 305-308.

Wang, "Multiple description coding for video delivery," in Proc. IEEE, Jan. 2005, pp. 57-70.

Tang and Au, "Unidirectional motion compensated temporal interpolation," in Proc. IEEE ISCAS, Jun. 1997, pp. 1444-1447.

Wong and Au, "Fast motion compensated temporal interpolation for video," in Proc. SPIE VCIP, May 1995, pp. 1108-1118.

Farber, "Analysis of error propagation in hybrid video coding with application to error resilience," in Proc. IEEE ICIP, Oct. 1999, pp. 550-554.

Girod and Farber, "Wireless video," in Compressed Video Over Networks, M.-T. Sun and A. R. Reibman, Eds. Marcel Dekker, 2000.

Wang, "Multiple description image coding for noisy channels by pairing transform coefficients," in IEEE MMSP, Jun. 1997, pp. 419-424.

* cited by examiner

ERROR CONCEALMENT FOR FRAME LOSS IN MULTIPLE DESCRIPTION CODING

TECHNICAL FIELD

The present disclosure relates generally to video transmission, and more particularly to error concealment for frame loss in a video transmission system that leverages multiple description coding.

BACKGROUND

Recent technological advances have led to video transmission becoming a more prevalently utilized form of communication. For instance, video data can be captured, encoded, and transferred over a transmission channel. Further, the video data can be received via the transmission channel, decoded, and outputted (e.g., rendered, displayed, . . . ). Various video compression techniques can be used to reduce the quantity of data utilized to represent video images; thus, compressed video can reduce bandwidth used for transfer of digital video over the transmission channel. Interframe compression, for example, is a type of video compression that can use one or more earlier or later frames in a sequence of frames to compress a current frame.

Oftentimes when video is transferred via a transmission channel, errors can occur. For instance, each frame in a transmitted sequence of video frames can be sent in one or more packets; thus, loss of a packet during transfer can result in loss of a frame. Error Resilience (ER) and Error Concealment (EC) techniques are oftentimes employed with video transmission today due to the use of predictive coding and Variable Length Coding (VLC) in video compression. For instance, conventional interframe compression techniques can yield I-frames and P-frames. Each P-frame is predicted from its immediate previous frame. Although the compression efficiency of this approach is high, it is vulnerable to errors in the transmission channel. If one frame is lost or corrupted during transmission, the error in the reconstructed frame at the decoder will propagate to the remaining frames until the next I-frame is received.

Several ER methods have been developed for video communication, such as Forward Error Correction (FEC), Layered Coding, and Multiple Description Coding (MDC). Different from the traditional Single Description Coding (SDC), MDC divides the video stream into equally important streams (descriptions), which are sent to the destination through different channels. Error may occur in the channels. Suppose the failure probability of each channel is independently and identically distributed with probability p. When using conventional SDC, the entire description will be lost with probability p; if M descriptions are used and sent on M different channels, the probability of losing the entire description is $p^M$, which is much less than p. An example implementation of MDC is an odd/even temporal sub-sampling approach, where an even frame in a frame sequence is predicted from the previous even frame and an odd frame in the frame sequence is predicted from the previous odd frame. Since the reference frames are farther in time, the prediction of such approach may not be as good as the conventional codec and the compression efficiency is lower. On the other hand, since each stream is encoded and transmitted separately, the corruption of one stream will not affect the other. As a result, the decoder can simply display the correct video stream at half the original frame rate, or reconstruct the corrupted frame by some appropriate EC technique (e.g., Temporal Interpolation, . . . ).

In conventional EC algorithms, the corrupted (e.g., lost, . . . ) frames are error-concealed. Further, the following frames are typically decoded as usual. Since error concealment can fail for the lost frame under various scenarios (e.g., new objects appearing, old objects disappearing, . . . ), a large initial error can be generated that can be propagated to following frames. However, conventional EC techniques typically fail to account for such error propagation to frames following a corrupted frame.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies for concealing frame loss in a video transmission environment are provided herein. Multiple Description Coding (MDC) can be used as an Error Resilience technique for video coding. In case of transmission errors, Error Concealment can be combined with MDC to reconstruct a lost frame, such that the propagated error to following frames can be reduced. Further, multi-hypothesis decoding can be employed to enhance reconstructed video quality of MDC over packet loss networks. For instance, one or more frames after the lost frame in the same stream can be reconstructed using multi-hypothesis decoding, which combines directly decoding and temporally interpolating these frames. Moreover, output obtained from directly decoding and temporally interpolating each frame can be combined by generating a weighted sum of these hypotheses. Constant weights and/or adaptive weights (e.g., determined based on the minimum mean square error criterion) can be used for yielding the weighted sum.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
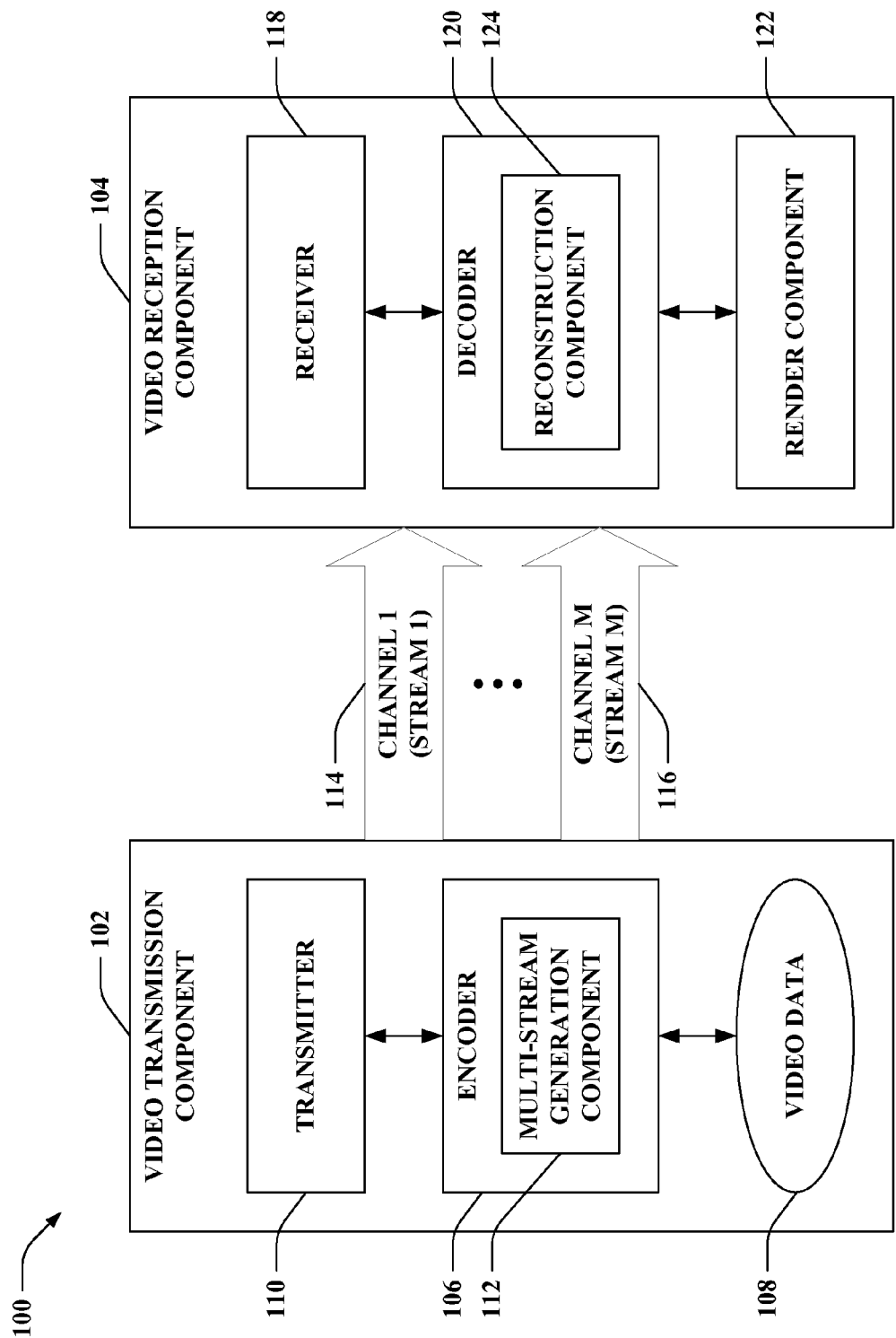
FIG. 1 is an illustration of an example system that conceals frame loss associated with video transmission to enhance video quality.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Various embodiments described herein support using Multiple Description Coding (MDC) as an Error Resilience (ER) technique for video coding. In case of transmission errors, Error Concealment (EC) can be combined with MDC to reconstruct the lost frame, such that the propagated error to the following frames is reduced. Further, an algorithm effectuating multi-hypothesis decoding can be employed to improve the reconstructed video quality of MDC over packet loss networks; thus, enhanced video quality can result from use of a Multi-Hypothesis Decoder (MHD) as compared to traditional EC techniques.

Now referring to FIG. 1, illustrated is a system 100 that conceals frame loss associated with video transmission to enhance video quality. The system 100 includes a video transmission component 102 and a video reception component 104 that can communicate any type of data related to video there between by way of any type of connection. Additionally, it is to be appreciated that any disparate type of data can be communicated between the video transmission component 102 and the video reception component 104. The video transmission component 102 can be a computing device (e.g., personal computer, a laptop, a handheld computing device, . . . ), a telephone (e.g., a cellular phone, a smart phone, a wireless phone, . . . ), a handheld communication device, a gaming device, a personal digital assistant (PDA), a teleconferencing system, a consumer product, an automobile, a mobile media player (e.g., MP3 player, . . . ), a camera (e.g., still image camera and/or video camera, . . . ), a server, a network node, or the like. Further, the video reception component 104 can be a computing device (e.g., personal computer, a laptop, a handheld computing device, . . . ), a telephone (e.g., a cellular phone, a smart phone, a wireless phone, . . . ), a handheld communication device, a gaming device, a personal digital assistant (PDA), a teleconferencing system, a consumer product, an automobile, a mobile media player (e.g., MP3 player, . . . ), a camera (e.g., still image camera and/or video camera, . . . ), a server, a network node, or the like. Although one video transmission component 102 and one video reception component 104 are depicted, it is to be appreciated that the system 100 can include any number of video transmission components similar to the video transmission component 102 and/or any number of video reception components similar to the video reception component 104. Moreover, according to an example, it is contemplated that the video transmission component 102 and the video reception component 104 can be substantially similar to each other; thus, at a disparate time (not shown), the video transmission component 102 can switch to be a video reception component and the video reception component 104 can switch to be a video transmission component. However, the claimed subject matter is not limited to the aforementioned example.

It is to be appreciated that the system 100 can employ any type of network architecture. Thus, for example, the video transmission component 102 and the video reception component 104 can transfer data there between employing a peer-to-peer architecture (e.g., the video transmission component 102 and the video reception component 104 can directly communicate with one another over a network connection, . . . ). Additionally or alternatively, data transmitted between the video transmission component 102 and the video reception component 104 can traverse through a network that includes disparate component(s) (not shown) (e.g., router(s), switch(es), gateway(s), node(s), . . . ). Further, packets including video data can traverse between the video transmission component 102 and the video reception component 104 by way of any wired and/or wireless medium(s).

The video transmission component 102 can further include an encoder 106 that encodes video data 108 and a transmitter 110 that transmits the encoded video data yielded from the encoder 106. For example, the video data 108 can be captured using a video camera (not shown). According to another illustration, the video data 108 can be retrieved from memory (not shown); the memory can be associated with the video transmission component 102 and/or can be external to the video transmission component 102.

The encoder 106 can encode the video data 108 for transmission. For instance, the encoder 106 can use interframe compression. The encoder 106 can further include a multi-stream generation component 112 that performs Multiple Description Coding (MDC) upon the video data 108. Thus, the multi-stream generation component 112 can yield M streams (e.g., M descriptions) from the video data 108, where M can be substantially any integer. Each of the M streams can be encoded separately by the multi-stream generation component 112. Moreover, each of the M streams outputted from the multi-stream generation component 112 can be sent to the video reception component 104 via a respective channel by the transmitter 110 (e.g., stream 1 can be sent over channel 1 114, . . . , stream M can be sent over channel M 116).

According to an example, the multi-stream generation component 112 can employ an odd/even temporal sub-sampling approach for a sequence of video frames. Following this example, the multi-stream generation component 112 can encode odd frames in the sequence together and even frames in the sequence together to yield two streams (e.g., odd stream and even stream). Thus, odd frames in the odd stream lack dependency upon even frames in the even stream and even frames in the even stream lack dependency upon odd frames in the odd stream. Hence, if an odd frame in the odd stream is lost, corrupted, etc., the subsequent odd frames in the odd stream can be impacted by such loss, corruption, etc. and the even frames in the even stream can be error free due to the lack of dependency upon the odd frames in the odd stream (e.g., the even frames can be decoded by the video reception component 104 with no error, . . . ).

The video reception component 104 can receive the M streams via the M channels 114-116. Moreover, the video reception component 104 can include a receiver 118, a decoder 120, and a render component 122. The receiver 118 can receive the streams communicated over the channels 114-116 and perform operations such as filtering, amplifying, demodulating, etc. upon the received signals. Further, the receiver 118 can provide an output of the received streams to the decoder 120, which decodes the received streams to yield the video frames. Moreover, the render component 122 can generate an output based upon the video frames. For example, the render component 122 can be a display upon which the video frames can be presented. According to another illustration, the render component 122 can enable storing the video frames obtained from the decoder 120 in memory (e.g., associated with the video reception component 104, external memory accessible by the video reception component 104, . . . ) (not shown); thus, the stored video frames retained in memory can be retrieved at a later time (e.g., by the render component 122, . . . ) and thereafter outputted (e.g., displayed, encoded and transferred to a disparate component (not shown), . . . ).

The decoder 120 can further include a reconstruction component 124 that reconstructs corrupted (e.g., lost, . . . ) frames as well as disparate frames in the received sequence to enhance video quality when such corruption occurs. Conventional EC techniques typically conceal corrupted frames, while following frames are oftentimes directly decoded as if no error occurred to an earlier frame in the sequence. Since error concealment can fail for the lost frame in some cases (e.g., new objects emerge, old objects disappear, . . . ), a large initial error can be generated and propagated to the following frames. The reconstruction component 124 mitigates error propagation by leveraging consideration of concealment of frame(s) following the corrupted frame to yield better video quality as compared to solely using direct decoding of such frame(s). For instance, the reconstruction component 124 can employ a multi-hypothesis decoder (MHD), which can utilize a concealed frame as an additional hypothesis to improve the reconstructed video quality. By way of illustration, the reconstruction component 124 can operate upon a plurality of video streams sent by the video transmission component 102 when employing Multiple Description Coding (MDC).

When odd/even sub-sampling is used in temporal MDC (e.g., as yielded by the multi-stream generation component 112, . . . ), an even frame is predicted from the previous even frame and an odd frame is predicted from the previous odd frame. These two streams (e.g., descriptions) can be sent to the video reception component 104 (e.g., the decoder 120, . . . ) through different channels 114-116. Consider the case of one frame loss during transmission. By using some Error Concealment (EC) technique, the reconstruction component 124 can reconstruct this frame at the decoder side with some error. Due to use of motion compensation, this error can propagate to the following frames in the same stream (e.g., description); for example, if the frame loss occurs in the odd stream, the error can be propagated to frames subsequent to the lost frame in the odd stream. By way of further illustration, the frame at time n can be $\psi(n)$ and the loss can occur at time $l_0$. To improve the reconstructed video quality after the loss position, the reconstruction component 124 can employ an algorithm based on multi-hypothesis decoding. Multi-hypothesis decoding can combine directly decoded and temporally interpolated (e.g., concealed, . . . ) frames to yield reconstructed frames.

Figure 2:
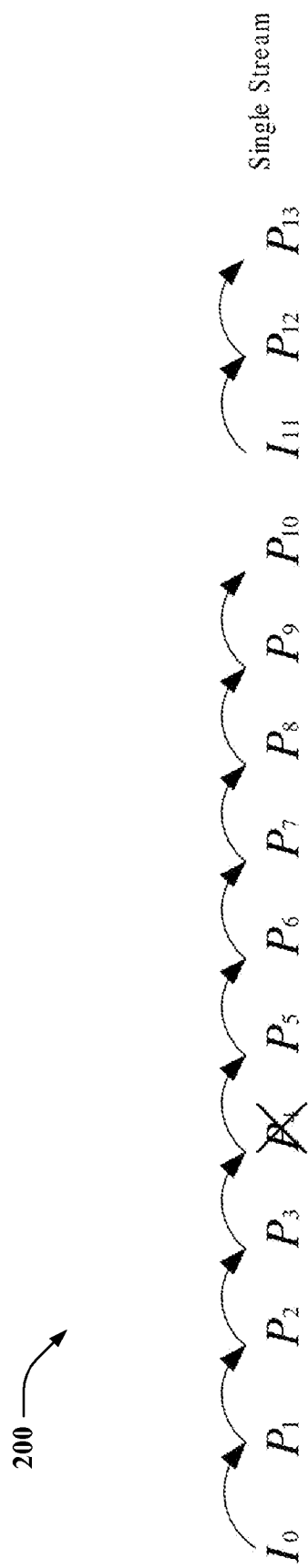
FIGS. 2-4 illustrate example video coding patterns that can be utilized in accordance with various aspects of the claimed subject matter.
Figure 3:
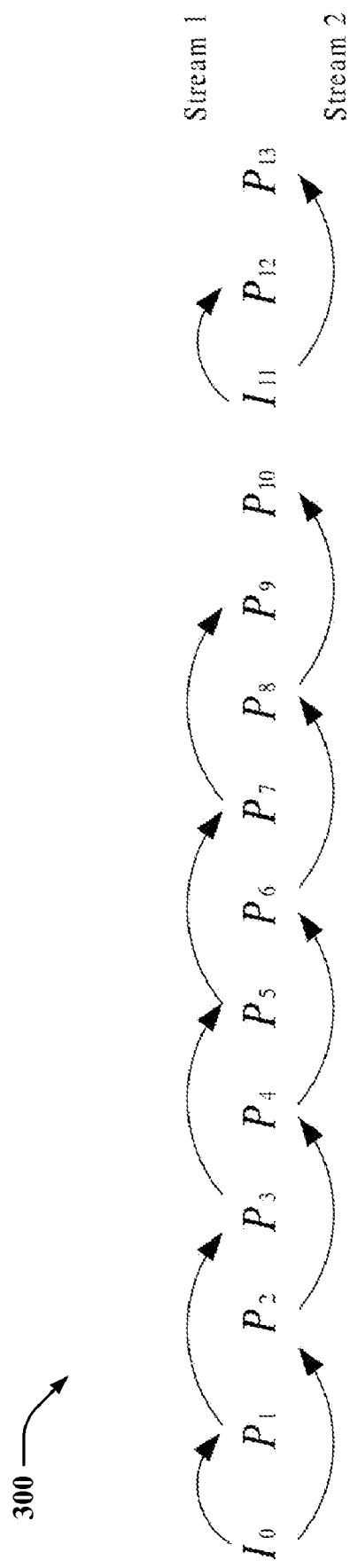
Figure 4:
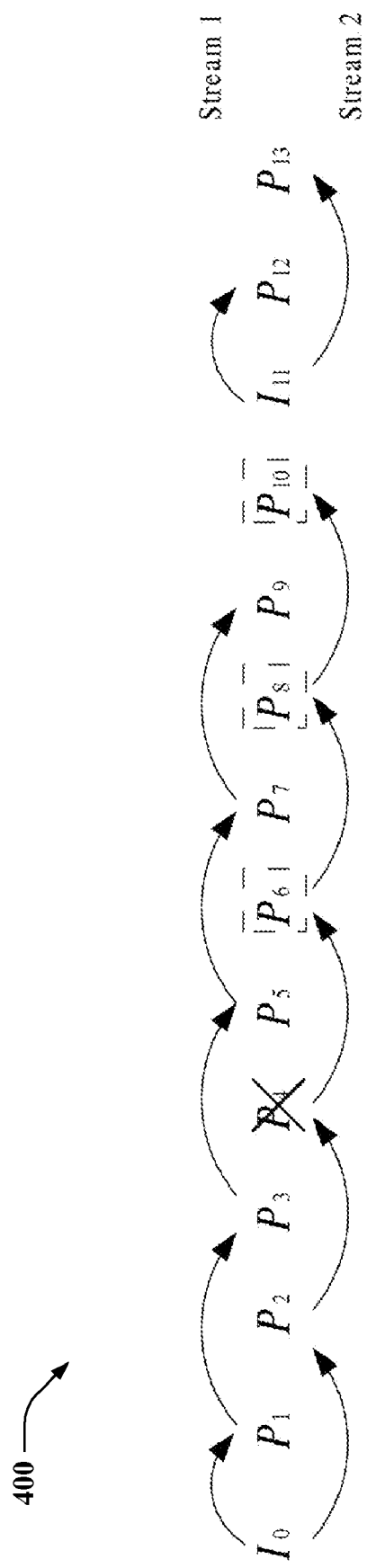

Referring to FIGS. 2-4, illustrated are example video coding patterns that can be utilized in accordance with various aspects of the claimed subject matter. Various types of frames can be supported for video encoding. Moreover, arrows depicted in FIGS. 2-4 represent the dependency of each of the frames where an earlier frame is used as a reference for a later frame. For example, a frame can be an intra frame (I-frame) or a prediction frame (P-frame). As depicted, a first frame in a group can be an I-frame ($I_0$) and the next ten frames can be P-frames ($P_1$-$P_{10}$). The following frame can begin a next group, and can be another I-frame ($I_{11}$) that is followed by additional P-frames. Moreover, this pattern can be repeated. Although a group is shown to include one I-frame and ten P-frames, it is to be appreciated that the claimed subject matter is not so limited; rather, any number of P-frames can be included between adjacent I-frames in a sequence of frames.

I-frames are independent frames that do not depend upon any other frames. I-frames are encoded statically, have a significant amount of the details and content (e.g., in comparison to the P-frames), and are typically larger in size compared to the P-frames. A P-frame includes encoded difference information (e.g., delta) based upon a comparison with a previous I-frame or P-frame, whichever is closer.

Further, each frame (e.g., I-frame, P-frame, . . . ) can include 1 to X packets, where X can be substantially any integer. Further, the number of packets can be a function of the size of the frame (e.g., which can be based upon the contents of the video). Loss of any packet can cause an entire frame to be dropped (e.g., corrupted, . . . ).

Turning to FIG. 2, illustrated is an example single stream video coding pattern 200. As shown, each P-frame is predicted from its immediately adjacent frame, which can be another P-frame or an I-frame. Although the compression efficiency of this approach can be high, the single stream video coding pattern 200 can be vulnerable to errors in the transmission channel. By way of example as shown, if $P_4$ is lost or corrupted during transmission, an error in a reconstructed frame at a decoder can propagate to the remaining frames until the next I-frame ($I_{11}$) is received.

Referring to FIG. 3, illustrated is an example odd/even sampling MDC pattern 300. According to this example, an even frame can be predicted from an immediately adjacent even frame and an odd frame can be predicted from an immediately adjacent odd frame. Further, a first even frame after an I-frame and a first odd frame after the I-frame can both refer to the I-frame (e.g., both $P_1$ and $P_2$ can refer to $I_0$, both $P_{12}$ and $P_{13}$ can refer to $I_{11}$, . . . ). Thus, two streams of frames can be yielded (e.g., stream 1 can include even frames and stream 2 can include odd frames). Each of these streams can be encoded and transmitted separately. Hence, corruption of one stream does not impact the other stream.

FIG. 4 illustrates an example odd/even sampling MDC pattern 400 that includes an error. The example pattern 400 depicts frame $P_4$ being corrupted. Following this example, the decoder can enable rendering the correct video stream (e.g., stream 1 including $P_5$, $P_7$, $P_9$, . . . ) at half the original frame rate subsequent to receiving the corrupted frame $P_4$ (e.g., rendering of frames $P_4$, $P_6$, $P_8$, and $P_{10}$ in stream 2 can be inhibited, . . . ). By way of another illustration, the corrupted frame (e.g., $P_4$, . . . ) can be reconstructed using an EC technique (e.g., temporal interpolation, . . . ). Temporal interpolation, for instance, can be combined with temporal MDC approaches. Thus, when frame $P_4$ is corrupted during the transmission, its surrounding frames (e.g., $P_3$ and $P_5$) can be correct if stream 1 is error-free. Hence, $P_3$ and $P_5$ can be used to reconstruct $P_4$ via interpolation.

Figure 5:
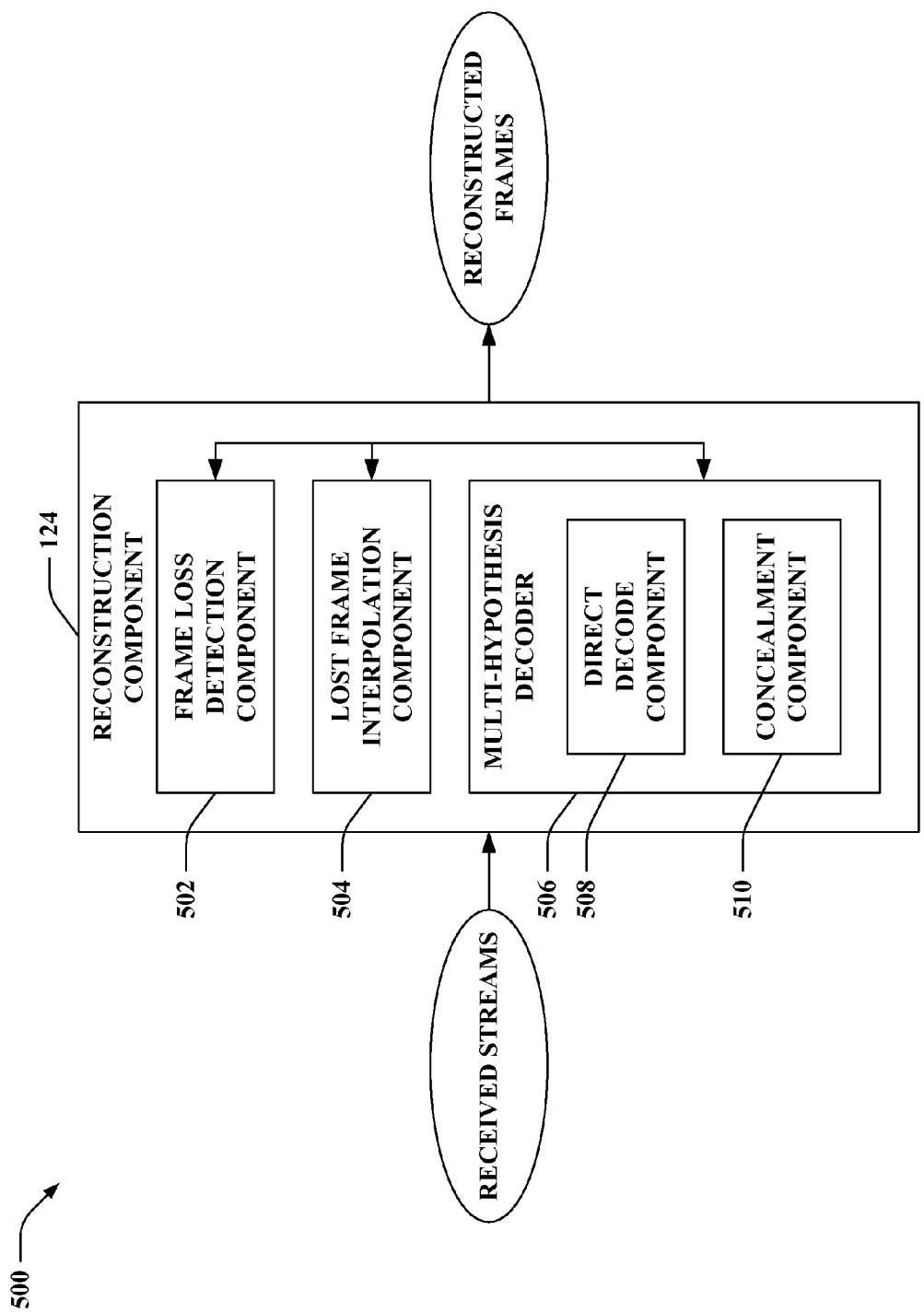
FIG. 5 is an illustration of an example system that reconstructs video frames using multi-hypothesis decoding.

With reference to FIG. 5, illustrated is a system 500 that reconstructs video frames using multi-hypothesis decoding. The system 500 includes the reconstruction component 124, which receives streams of video data (e.g., obtained by the receiver 118 of the video reception component 104 of FIG. 1, . . . ). Further, the reconstruction component 124 can yield reconstructed frames (e.g., the reconstructed frames can be provided to the render component 122 of FIG. 1 to be displayed, stored, . . . ). It is to be appreciated that the reconstruction component 124 can be included in a decoder (e.g., the decoder 120 of FIG. 1, . . . ), coupled to a decoder, a combination thereof, or the like. According to another example, the reconstruction component 124 can be a decoder; however, the claimed subject matter is not so limited.

The reconstruction component 124 can further include a frame loss detection component 502 that identifies frame loss, corruption, and so forth from the received streams. For instance, the frame loss detection component 502 can determine that one or more packets of a frame to be included in one of the streams failed to be received via a transmission channel, one or more packets of a frame included in one of the streams are unreadable or altered in an unintended manner, and so forth. Moreover, along with recognizing frame loss, corruption, and the like, the frame loss detection component 502 can decipher characteristics of the lost, corrupted, etc. frame. By way of illustration, a characteristic identified by the frame loss detection component 502 can be the stream associated with the lost, corrupted, etc. frame (e.g., the stream in which the lost, corrupted, etc. frame is or was intended to be included, . . . ). According to a further example, the position of the lost, corrupted, etc. frame within the respective stream (e.g., number of P-frames between the lost, corrupted, etc. frame and a closest prior I-frame and/or a closest subsequent I-frame, . . . ) can be a characteristic recognized by the frame loss detection component 502. Moreover, the characteristic(s) recognized by the frame loss detection component 502 can be a frame type of the lost, corrupted, etc. frame (e.g., I-frame, P-frame, . . . ) and/or dependency information related to the lost, corrupted, etc. frame.

Further, the reconstruction component 124 can include a lost frame interpolation component 504 that performs error concealment for the lost, corrupted, etc. frame using temporal interpolation. Temporal interpolation can be used by the lost frame interpolation component 504 to generate one or more frames between two received frames (e.g., frames that lack error, . . . ) so as to improve the effective frame rate, and make object motions in the video smoother. The generated frames can be included in the outputted sequence of reconstructed frames to replace the lost, corrupted, etc. frames. According to an example, the lost frame interpolation component 504 can perform both forward and backward motion estimations to track motions of the objects between adjacent received frames; however, this can lead to high computational costs. By way of another illustration, the lost frame interpolation component 504 can utilize Unidirectional Motion Compensated Temporal Interpolation (UMCTI), which performs only forward motion estimation, and thus, can save about half of the computation time as compared to using both forward and backward motion estimations. Pursuant to other examples, the lost frame interpolation component 504 can employ Overlapped Motion Compensated Temporal Interpolation (OMCTI), Modified Fast Motion Compensated Temporal Interpolation (MFMCTI), Multiframe Optical Flow Estimation, and/or Three-Loop Temporal Interpolation (TLTI) to reconstruct lost frame(s) using the received information.

Use of temporal interpolation by the lost frame interpolation component 504 can be well combined with temporal MDC techniques used to encode the video frames. Referring again to FIG. 4, when frame $P_4$ is corrupted during transmission, its surrounding frames ($P_3$ and $P_5$) would be correct if stream 1 is error-free due to the independent failure probability of each channel. Thus, the lost frame interpolation component 504 can utilize $P_3$ and $P_5$ to interpolate $P_4$ with good quality. In addition, the motion vector from $P_5$ to $P_3$ is conserved in stream 1, and thus, enables skipping the exhaustive motion estimation process. Returning back to FIG. 5, since the reconstruction component 124 also improves the reconstructed video quality after the loss position, the lost frame interpolation component 504 can use UMCTI to error-conceal the lost, corrupted, etc. frame. For instance, use of UMCTI by the lost frame interpolation component 504 can employ a time for interpolation that can be linear to the frame size, thus reducing the complexity of multi-hypothesis decoding for the following frames as described below.

The reconstruction component 124 also includes a multi-hypothesis decoder 506 that reconstructs frames in a stream subsequent to the lost, corrupted, etc. frame. By way of example, two streams can be obtained by the reconstruction component 124. The frame loss detection component 502 can determine that frame $P_4$, which is included in stream 2, is corrupted during transmission. Thus, the lost frame interpolation component 504 can reconstruct frame $P_4$. Moreover, the multi-hypothesis decoder 506 can reconstruct one or more frames after frame $P_4$ included in stream 2 (e.g., $P_6$, $P_8$, $P_{10}$, . . . ). The multi-hypothesis decoder 506 can further include a direct decode component 508 and a concealment component 510.

In contrast to use of the multi-hypothesis decoder 506, typically in conventional EC algorithms, only the corrupted (lost) blocks are error-concealed. Although the following frames can be decoded as usual, error exists due to the use of temporal prediction. Thus, in the above example, since frame $P_6$ references frame $P_4$, which may include errors when reconstructed, such errors can be propagated to frame $P_6$. For instance, spatial filtering in motion compensation can help to attenuate the propagated error energy. It can be an explicit loop filter, or implicitly brought by the bilinear interpolation for sub-pixel motion compensation. Without generality, suppose $\psi(I_0)$ belongs to description 1 (D1). The multi-hypothesis decoder 506 can use two techniques to reconstruct the following frames in D1 (e.g., frames subsequent to ψ(l₀)): decoding directly as in the conventional codec with the direct decode component 508, and interpolation using the same EC methods as that for ψ(l₀) with the concealment component 510. It may seem at the first sight that the latter one is unnecessary, since the decoding process itself can decrease the propagated error. However, error concealment may fail for ψ(l₀) in some special cases (e.g., new objects appearing, old objects disappearing, . . . ), thus leading to a large initial error. In such circumstances, error-concealing the frames after ψ(l₀) with the concealment component 510 can yield a better quality than decoding them directly with the direct decode component 508.

Based upon the foregoing, frame ψ(l₀+2t) can be reconstructed by the multi-hypothesis decoder 506 employing a weighted sum of the output of the direct decode component 508 and the output of the concealment component 510 (e.g., weighted sum of two hypotheses). This weighted sum can be represented as follows:

$$\hat{\psi}(I_0+2t)=h_1\psi^d(I_0+2t)+h_2\psi^c(I_0+2t), \quad (1)$$

where t∈[1, N] and h₁+h₂=1. ψ$^d$(l₀+2t) and ψ$^c$(l₀+2t) are the corresponding frames obtained by decoding (e.g., via the direct decode component 508) and concealment (e.g., via the concealment component 510), respectively. 2t is used here to specify the frames in the same description (e.g., D1, same stream, . . . ) as ψ(l₀) (e.g., when two streams are received, . . . ). N is a constant specifying a time interval to apply the multi-hypothesis reconstruction. Pursuant to an example, N can be 4, 5, or 6; however, it is to be appreciated that the claimed subject matter is not so limited as substantially any integer can be used for N. According to another example, N can be dynamically adjustable (e.g., based upon severity of an error, convergence to steady state signal-to-noise ratio, location of error in comparison to immediately prior I-frame or immediately subsequent I-frame, . . . ). According to another illustration, the weights h₁ and h₂ in (1) can be constant for t∈[1, N]; however, the claimed subject matter is not so limited since adaptively determined weights can be utilized. It is to be noted, if h₁ is set to equal 1 in (1) or a zero time interval is used (e.g., N=1), the multi-hypothesis decoder 506 becomes a conventional decoder.

Figure 6:
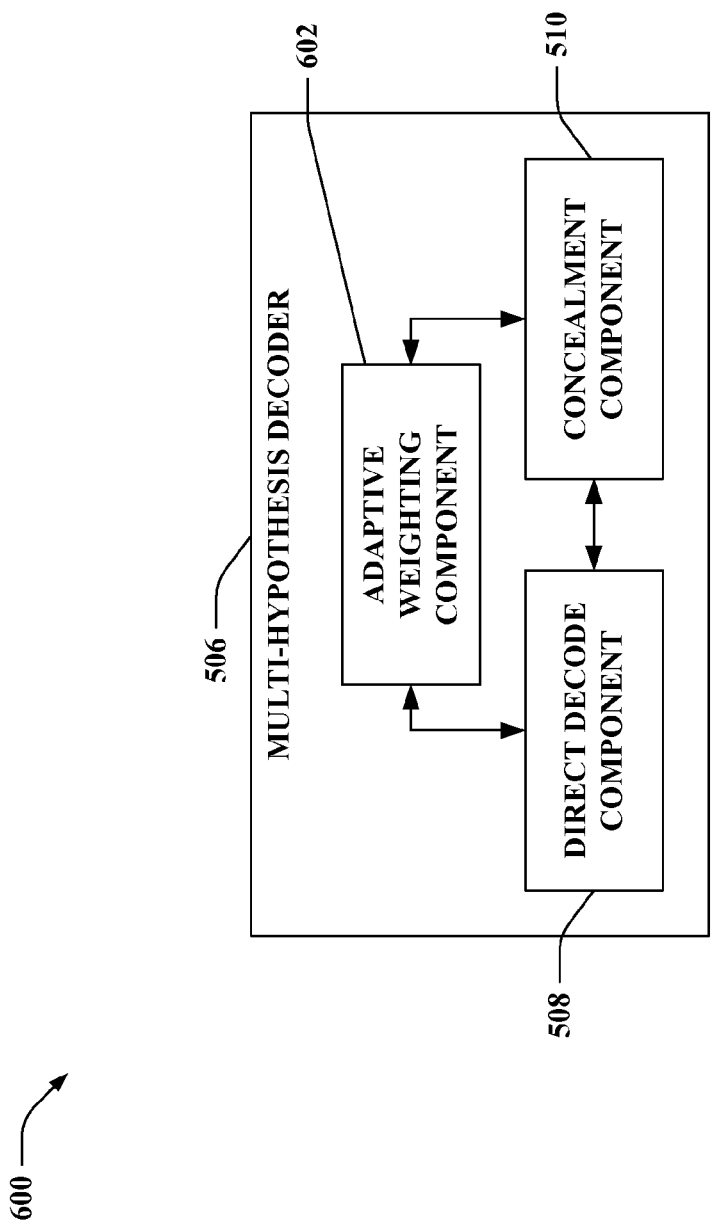
FIG. 6 is an illustration of an example system that employs multi-hypothesis decoding with adaptive weights.

Turning to FIG. 6, illustrated is a system 600 that employs multi-hypothesis decoding with adaptive weights. The system 600 includes the multi-hypothesis decoder 506, which can further comprise the direct decode component 508 and the concealment component 510. Further, the multi-hypothesis decoder 508 can include an adaptive weighting component 602 that adaptively determines respective weights to apply to the outputs of the direct decode component 508 and the concealment component 510. Thereafter, the multi-hypothesis decoder 506 can use the adaptively determined weights to yield a weighted sum corresponding to a video frame.

The adaptive weighting component 602 can adaptively determine the weights h₁ and h₂ based on the minimum mean square error (MMSE) criterion:

$$h_1 = \frac{\sigma_c^2}{\sigma_d^2 + \sigma_c^2}, \quad (2)$$
$$h_2 = \frac{\sigma_d^2}{\sigma_d^2 + \sigma_c^2},$$

where $\sigma_d^2 = E\{(\psi^d(l_0+2t)-\tilde{\psi}(l_0+2t))^2\}$ and $\sigma_c^2 = E\{\psi^c(l_0+2t)-\tilde{\psi}(l_0+2t))^2\}$. Further, $\tilde{\psi}(l_0+2t)$ is the original reconstructed frame of ψ(l₀+2t) at the encoder side. (2) can be derived based upon the assumption that $(\psi^d(l_0+2t)-\tilde{\psi}(l_0+2t))$ and $(\psi^c(l_0+2t)-\tilde{\psi}(l_0+2t))$ are uncorrelated random variables with zero mean.

Further, the adaptive weighting component 602 can define error ε(t) to be the difference between ψ$^d$(l₀+2t) and $\tilde{\psi}$(l₀+2t). As stated previously, spatial filtering can attenuate the propagated error energy. For instance, a decoder in general can be regarded as a linear system and its impulse response can be approximated as a Gaussian filter. Based on the central limit theory, the impulse response of the multi-hypothesis decoder 602 can similarly be Gaussian. Thus, the following can be derived:

$$\sigma^2(t) = \frac{\sigma^2(0)}{1+\gamma t}, \quad (3)$$

where σ²(t) is the variance of ε(t). γ is a parameter describing the efficiency of the loop filter to attenuate the error, which typically can be γ∈(0,1). Based on (3), the following can be obtained:

$$\sigma_d^2 = \frac{\sigma^2(0)}{1+\gamma t}. \quad (4)$$

Since the same error concealment technique can be used to interpolate the lost frame (e.g., as effectuated by the lost frame interpolation component 504 of FIG. 5), the error variance of ψ$^c$(l₀+2t) approximates to that of ψ$^c$(l₀) as represented by the following:

$$\sigma_c^2 \approx \sigma^2(0). \quad (5)$$

By using (2), (4), and (5), the values of h₁ and h₂ can be obtained by the adaptive weighting component 602.

Figure 7:
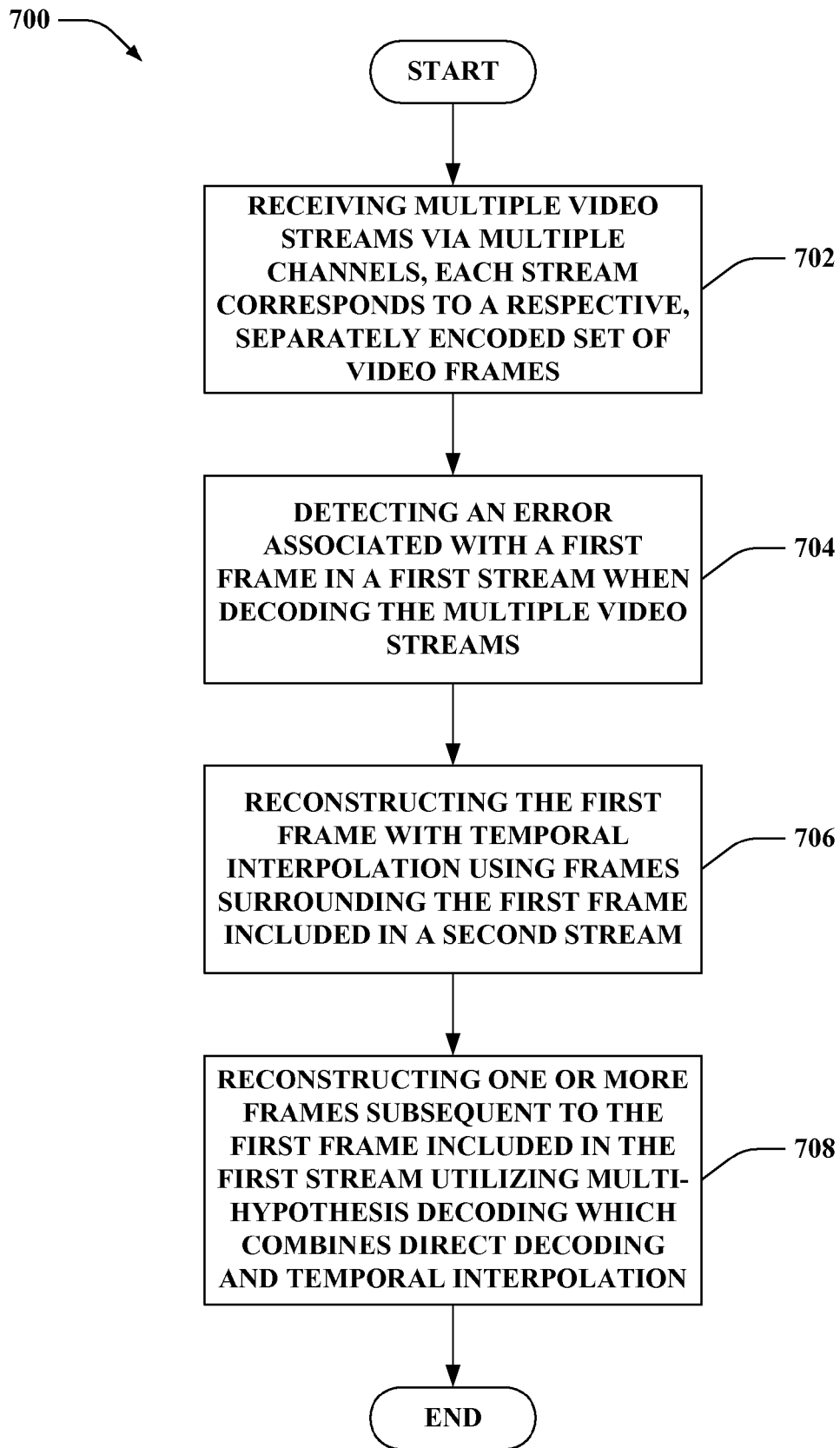
FIG. 7 is an illustration of an example methodology that facilitates concealing video frame loss in a video transmission environment.
Figure 8:
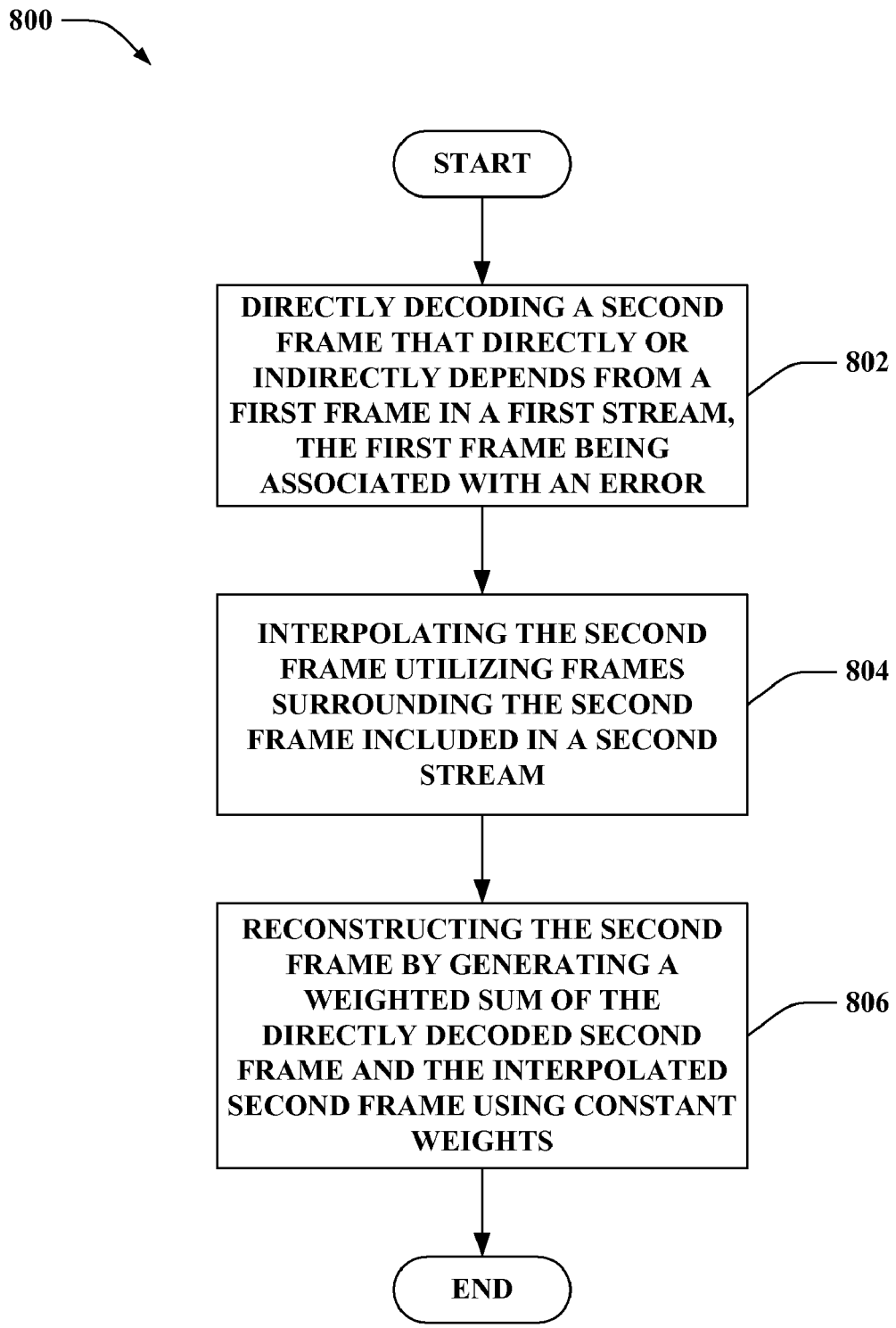
FIG. 8 is an illustration of an example methodology that facilitates employing multi-hypothesis decoding with constant weights.
Figure 9:
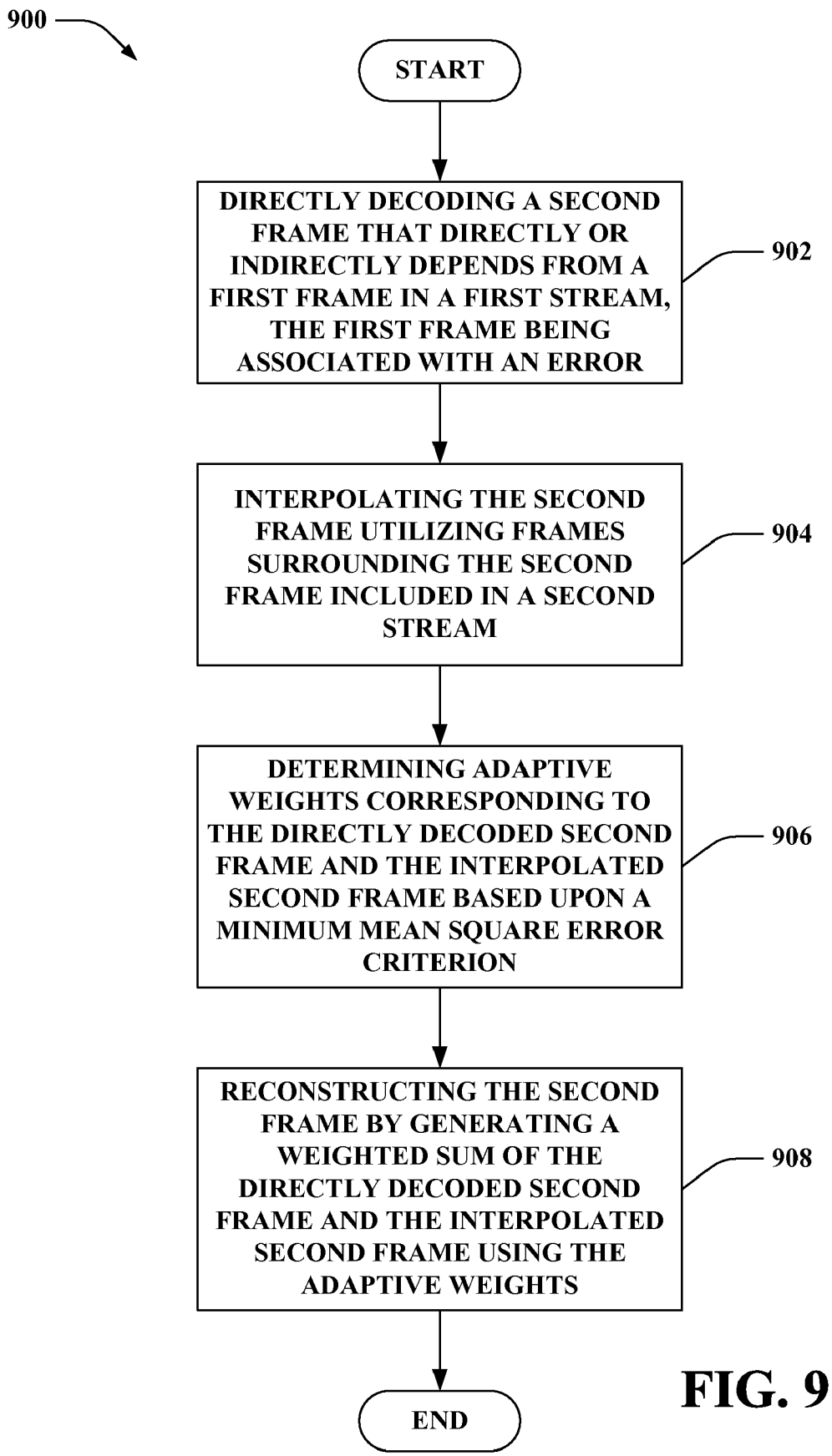
FIG. 9 is an illustration of an example methodology that facilitates effectuating multi-hypothesis decoding with adaptive weights.

Referring now to FIGS. 7-9, methodologies that can be implemented in accordance with various aspects described herein are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers, . . . ). Such components, inter alia, can automate certain mechanisms or processes performed thereby to make portions of the systems and methods more adaptive as well as efficient and intelligent.

Referring now to FIG. 7, illustrated is an example methodology 700 that facilitates concealing video frame loss in a video transmission environment. At 702, multiple video streams can be received via multiple channels, where each stream can correspond to a respective, separately encoded set of video frames. For example, two streams (e.g., descriptions) can be obtained upon two channels (e.g., a first stream can be received upon a first channel and a second stream can be received upon a second channel). Further, the multiple video streams can be yielded at an encoder side by employing Multiple Description Coding (MDC). According to an illustration, an odd/even temporal sub-sampling approach can be used in MDC. At 704, an error associated with a first frame in a first stream can be detected when decoding the multiple video streams. For instance, the first frame can be lost, corrupted, or the like during transmission. At 706, the first frame can be reconstructed with temporal interpolation using frames surrounding the first frame included in a second stream. Pursuant to an example, Unidirectional Motion Compensated Temporal Interpolation (UMCTI) can be used to estimate the first frame. Further, the first frame can be reconstructed by performing interpolation based upon a first adjacent frame that is prior to the first frame in a sequence and a second adjacent frame that is subsequent to the first frame in the sequence (e.g., these adjacent frames being included in the second stream and surrounding the first frame in time, . . . ).

At 708, one or more frames subsequent to the first frame included in the first stream can be reconstructed utilizing multi-hypothesis decoding which combines direct decoding and temporal interpolation. The one or more frames can exhibit error propagation due to the dependent nature of the video frames (e.g., each P-frame referring to a previous P-frame or I-frame, . . . ). For instance, multi-hypothesis decoding can enable regaining video quality faster than using direct decoding in isolation, and thus, user experience can be enhanced. Moreover, the number of frames subsequent to the first frame reconstructed using multi-hypothesis decoding can equal N, where N is substantially any integer. For example, N can be 4, 5, or 6; however, the claimed subject matter is not so limited. According to another illustration, N can be dynamically adjustable (e.g., based upon severity of an error, convergence to steady state signal-to-noise ratio, location of error in comparison to immediately prior I-frame or immediately subsequent I-frame, . . . ). Frames after the multi-hypothesis decoded frames can be directly decoded, for instance. Further, the direct decoding and temporal interpolation can each be weighted (e.g., constant weights, adaptive weights, . . . ) and combined. Additionally, the processed frames can be rendered, stored, and so forth.

Turning to FIG. 8, illustrated is an example methodology 800 that facilitates employing multi-hypothesis decoding with constant weights. At 802, a second frame that directly or indirectly depends from a first frame in a first stream can be directly decoded, where the first frame can be associated with an error. For instance, the first frame can be lost, corrupted, etc. At 804, the second frame can be interpolated utilizing frames surrounding the second frame included in a second stream. By way of illustration, even frames can be included in the first stream and odd frames can be included in the second frame. Following this illustration, frame 4 can be lost, corrupted, etc. during transmission of the first stream. Moreover, frame 6 can be included in the first stream and can directly depend upon (e.g., refer to, . . . ) frame 4. Thus, frame 6 can be both directly decoded and temporally interpolated based upon frames 5 and 7, both of which can be included in the second stream. At 806, the second frame can be reconstructed by generating a weighted sum of the directly decoded second frame and the interpolated second frame using constant weights. The weighted sum for the second frame can be determined by evaluating $\hat{\psi}(l_0+2t)=h_1\psi^d(l_0+2t)+h_2\psi^c(l_0+2t)$, where $t\in[1, N]$ and $h_1+h_2=1$. $\psi^d(l_0+2t)$ and $\psi^c(l_0+2t)$ are the corresponding frames obtained by direct decoding and concealment (e.g., temporal interpolation), respectively. Further, 2t is used to specify the frames in the same description (e.g., D1, same stream, . . . ) as $\psi(l_0)$ (e.g., when two streams are received, . . . ). Moreover, $h_1$ and $h_2$ can be constants. For example, constant values for $h_1$ and $h_2$ can be selected for use based upon a time interval N over which multi-hypothesis decoding is effectuated.

Now referring to FIG. 9, illustrated is an example methodology 900 that facilitates effectuating multi-hypothesis decoding with adaptive weights. At 902, a second frame that directly or indirectly depends from a first frame in a first stream can be directly decoded, where the first frame can be associated with an error. At 904, the second frame can be interpolated utilizing frames surrounding the second frame included in a second stream. At 906, adaptive weights corresponding to the directly decoded second frame and the interpolated second frame can be determined based upon a minimum mean square error criterion. At 908, the second frame can be reconstructed by generating a weighted sum of the directly decoded second frame and the interpolated second frame using the adaptive weights.

The efficacy of the above described embodiments can be verified by simulated results, as presented in non-limiting fashion in FIGS. 10-14. In the simulations, the performance of MHD can be compared to the original UMCTI algorithm, by both subjective and objective results. MHD with constant weights (CMHD) and MHD with adaptively determined weights (AMHD) are both simulated. The value of parameter γ in AMHD is trained to be 0.8. For UMCTI, only the lost frames are error-concealed and the following frames are decoded as usual. The first 300 frames of video sequences Carphone and Sales (QCIF) are encoded at 15 fps, and only the first frame is an 1-frame. Fixed QP is used: for Carphone, 28 is used for I-frame and 30 for P-frame; for Sales, 27 is used for I-frame and 29 for P-frame. To generate two descriptions, ref_idx_10 is specified for each P-frame to simulate the odd/even sub-sampling MDC. The I-frame can be sent twice to the two streams, since the focus of the simulation can be to compare the error resilience properties instead of the compression efficiency of MDC.

Figure 10:
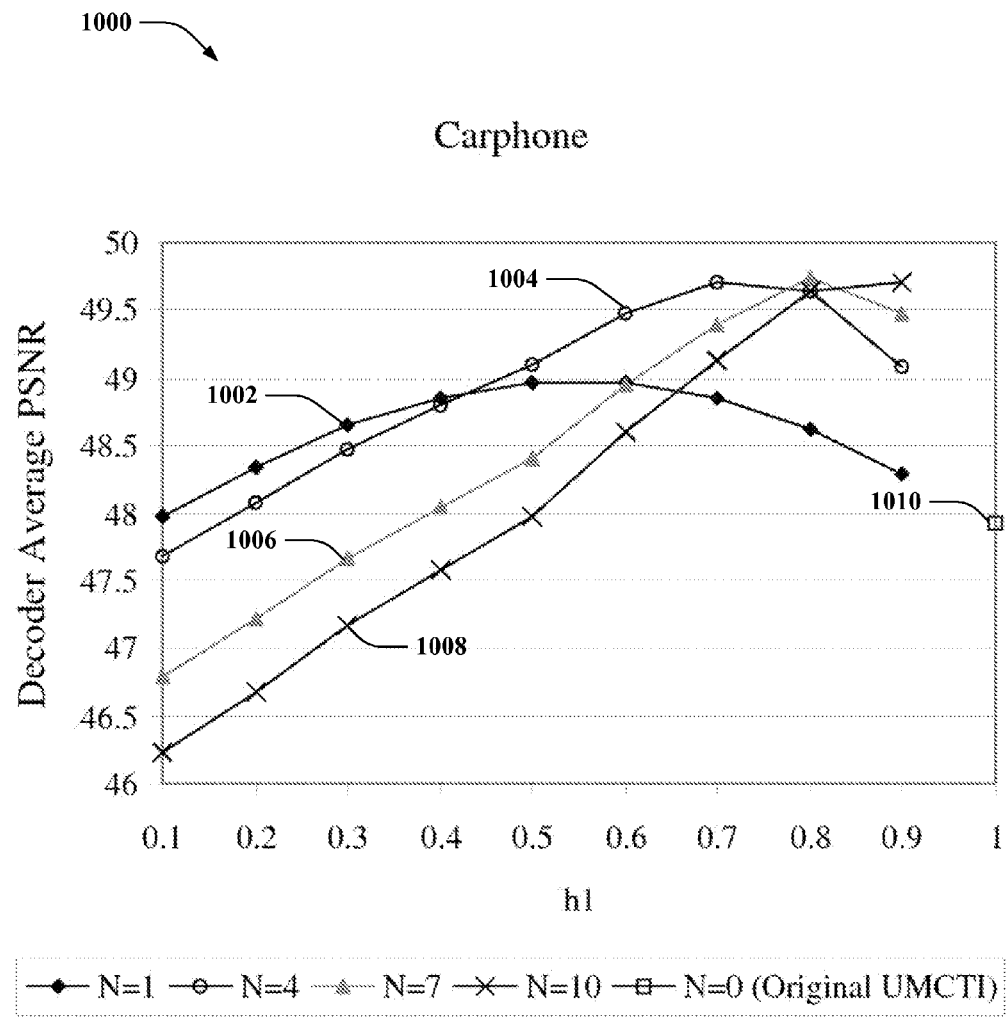
FIGS. 10-14 illustrate various simulations depicting multi-hypothesis decoding performance under different conditions according to various embodiments.
Figure 11:
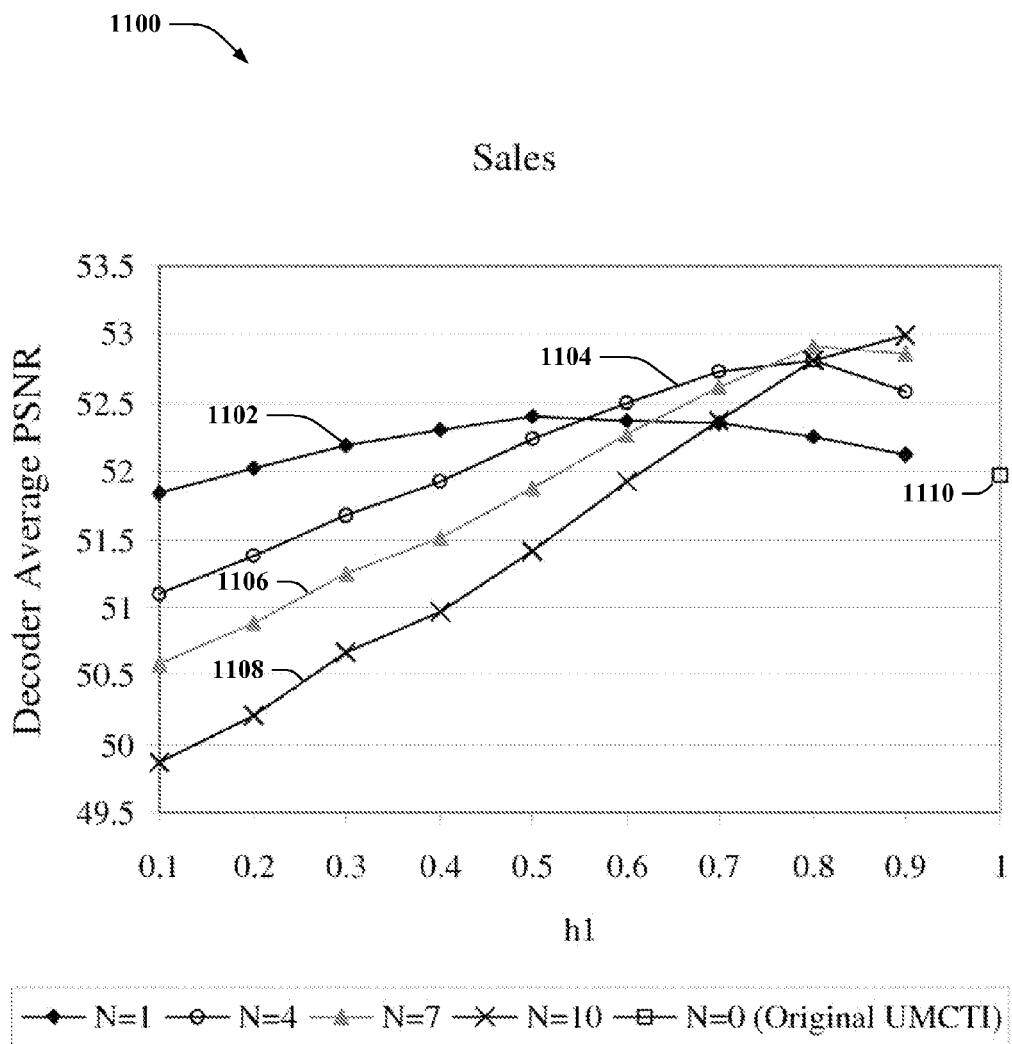

Graphs 1000 and 1100 of FIGS. 10 and 11, respectively, show the relationship between the value of weighting parameter $h_1$ and the average peak signal-to-noise ratio (PSNR) at a decoder side when differing values of N are utilized for two disparate video sequences (e.g., Carphone and Sales). Graph 1000 of FIG. 10 relates to the Carphone video sequence. In graph 1000, curve 1002 illustrates the average PSNR at the decoder as a function of $h_1$ when N=1, curve 1004 illustrates the average PSNR at the decoder as a function of $h_1$ when N=4, curve 1006 depicts the average PSNR at the decoder as a function of $h_1$ when N=7, and curve 1008 represents the average PSNR at the decoder as a function of $h_1$ when N=10. Moreover, value 1010 illustrates the PSNR at the decoder when N=0 (e.g., original UMCTI, . . . ). Graph 1100 of FIG. 11 relates to the Sales video sequence. In graph 1100, curve 1102 illustrates the average PSNR at the decoder as a function of $h_1$ when N=1, curve 1104 illustrates the average PSNR at the decoder as a function of $h_1$ when N=4, curve 1106 depicts the average PSNR at the decoder as a function of $h_1$ when N=7, and curve 1108 represents the average PSNR at the decoder as a function of $h_1$ when N=10. Moreover, value 1110 illustrates the PSNR at the decoder when N=0 (e.g., original UMCTI, ...).

As shown in FIGS. 10 and 11, the effect of weighting parameter $h_1$ on the performance of MHD is illustrated. Suppose the two video streams are transmitted though two packet loss channels, and the failure probability of each channel is independent and identically distributed with probability P. According to the illustrated example, P can be 3%; however, the claimed subject matter is not so limited. In the example depicted, one packet can include the information of one frame, and the loss of one packet can lead to the loss of one entire frame. Four different Time Intervals (N) are used in the example illustration (e.g., N can be 1, 4, 7, or 10). For each combination of $h_1$ and N, the video sequence can be transmitted 100 times. The average PSNR is obtained at the decoder side and plotted in FIGS. 10 and 11. For the comparison, the PSNR obtained by the original UMCTI algorithm is also plotted (e.g., value 1010 and value 1110). As shown in FIGS. 10 and 11, an optimal $h_1$ can be obtained for a specific N, which has the maximum PSNR in the corresponding curve; for instance, the larger N is, the bigger the optimal $h_1$ is. For N=1 and $h_1$=0.5 in Carphone as illustrated in FIG. 10, about 1 dB gain can be obtained compared to the original UMCTI. When N is larger, more gains can be achieved with an optimal $h_1$. It is to be noted that the encoder reconstructed frame (the error-free frame) can be used as the reference in the calculation of PSNR. Similar behaviors can be observed if the original frame (the uncompressed frame) is used as the reference.

Figure 12:
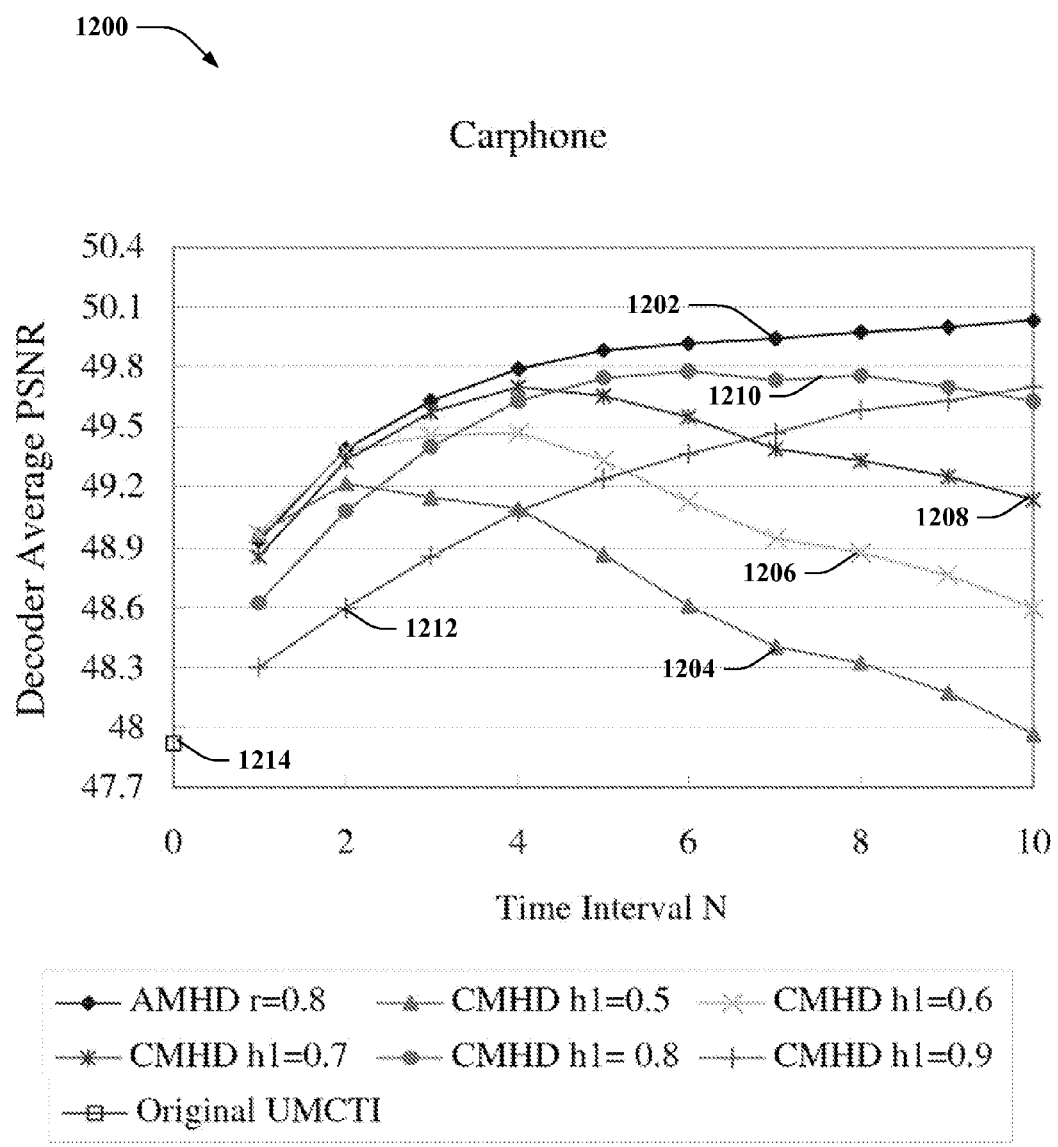
Figure 13:
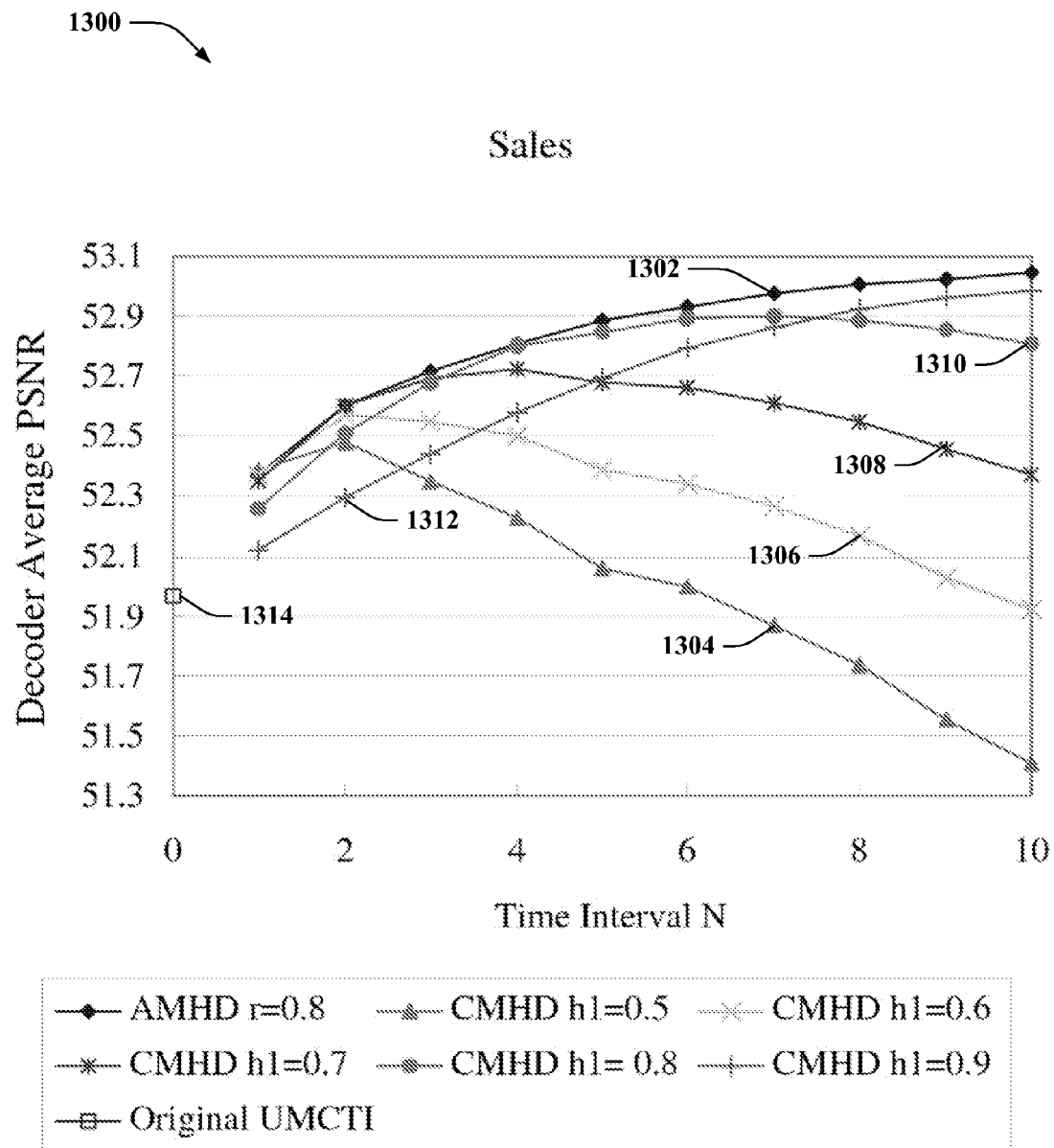

Graphs 1200 and 1300 of FIGS. 12 and 13, respectively, show comparison between CMHD and AMHD with $\gamma$=0.8. Further, the packet loss rate (e.g., P) can be 3%; however, the claimed subject matter is not so limited. Graph 1200 of FIG. 12 relates to the Carphone video sequence. In graph 1200, curve 1202 illustrates the average PSNR at the decoder as a function of N when AMHD is employed (e.g., with $\gamma$=0.8), curve 1204 illustrates the average PSNR at the decoder as a function of N when CMHD with $h_1$=0.5 is used, curve 1206 depicts the average PSNR at the decoder as a function of N when CMHD with $h_1$=0.6 is utilized, curve 1208 illustrates the average PSNR at the decoder as a function of N when CMHD with $h_1$=0.7 is employed, curve 1210 represents the average PSNR at the decoder as a function of N when CMHD with $h_1$=0.8 is utilized, and curve 1212 illustrates the average PSNR at the decoder as a function of N when CMHD with $h_1$=0.9 is used. Further, value 1214 illustrates the PSNR at the decoder for the original UMCTI. Graph 1300 of FIG. 13 relates to the Sales video sequence. In graph 1300, curve 1302 illustrates the average PSNR at the decoder as a function of N when AMHD is employed (e.g., with $\gamma$=0.8), curve 1304 illustrates the average PSNR at the decoder as a function of N when CMHD with $h_1$=0.5 is used, curve 1306 depicts the average PSNR at the decoder as a function of N when CMHD with $h_1$=0.6 is utilized, curve 1308 illustrates the average PSNR at the decoder as a function of N when CMHD with $h_1$=0.7 is employed, curve 1310 represents the average PSNR at the decoder as a function of N when CMHD with $h_1$=0.8 is utilized, and curve 1312 illustrates the average PSNR at the decoder as a function of N when CMHD with $h_1$=0.9 is used. Further, value 1314 illustrates the PSNR at the decoder for the original UMCTI.

In FIGS. 12 and 13, the comparison between AMHD and CMHD is given for different Time Intervals. As shown in graphs 1200 and 1300, the PSNR of AMHD is higher than CMHD for most of the compared values of N. Moreover, a larger value N corresponds to a higher PSNR of AMHD. Although for a small N. CMHD with an appropriate $h_1$ can obtain a higher PSNR than AMHD, its performance (PSNR) decreases when N is larger. In these situations (e.g., when N>2, ...), AMHD can be preferred to yield better performance.

Figure 14:
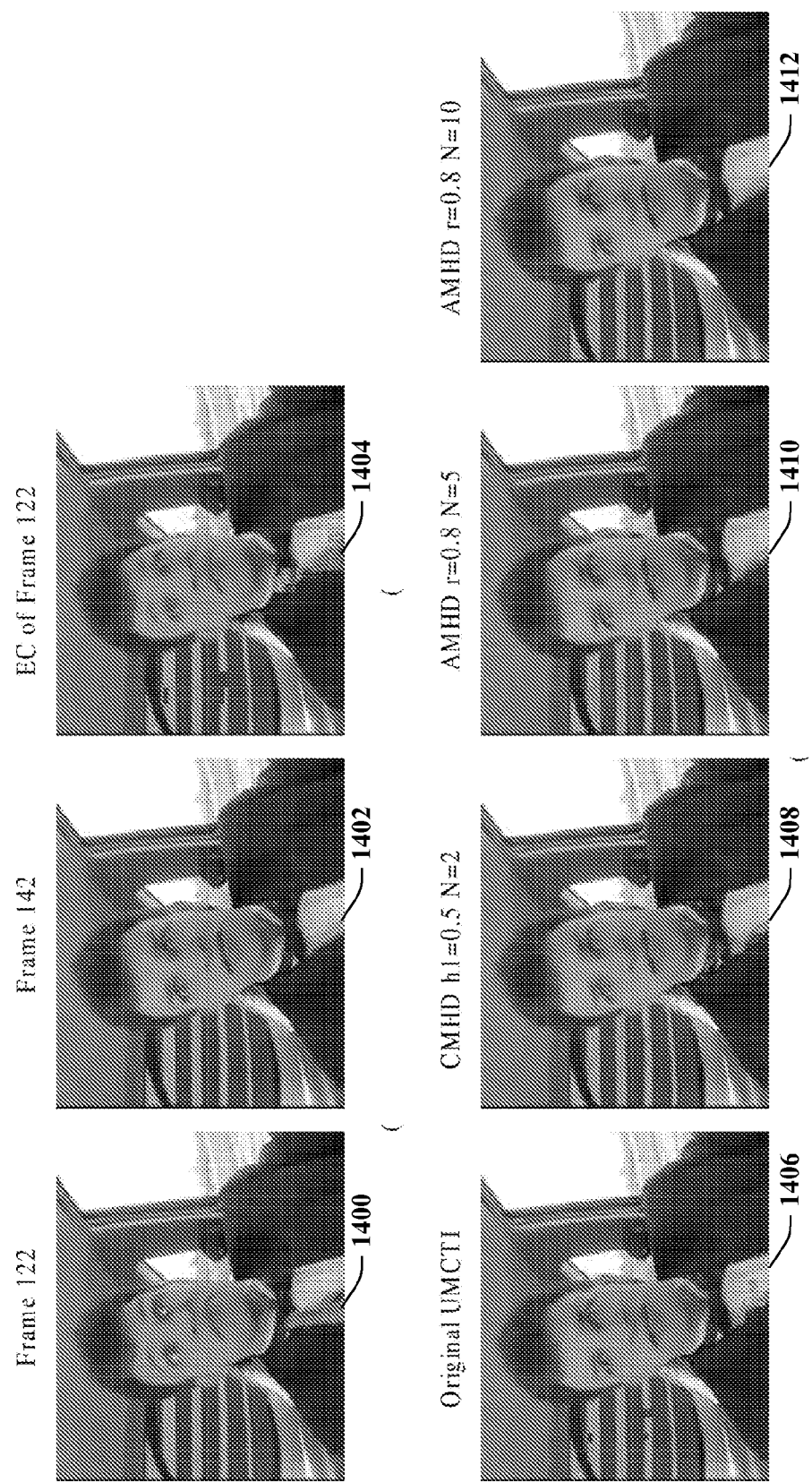

Now referring to FIG. 14, illustrated are visual results of applying UMCTI and MHD on a video sequence (e.g., the Carphone video sequence described above). According to the depicted example, one frame can be lost (e.g., frame 122). Frame 1400 is original encoded frame 122 without loss and frame 1402 is original encoded frame 142 without loss. Further, frame 1404 is concealed frame 122 that can be reconstructed using UMCTI. Moreover, frames 1406-1412 illustrate reconstructed frame 142 generated under various scenarios. In particular, frame 1406 is frame 142 reconstructed using the original UMCTI, frame 1408 is frame 142 reconstructed utilizing CMHD with $h_1$=0.5 and N=2, frame 1410 is frame 142 reconstructed using AMHD with $\gamma$=0.8 and N=5, and frame 1412 is frame 142 reconstructed employing AMHD with $\gamma$=0.8 and N=10.

FIG. 14 illustrates the visual quality after applying UMCTI and MHD on Carphone for one frame loss (e.g., frame 122). Frames 1400 and 1402 are the original reconstructed frames at the encoder side, and frame 1404 is the error-concealed frame 122 using UMCTI. As depicted, since the finger enters the scene with a large motion, the interpolation can work poorly around this region. Further, frames 1406-1412 are reconstructed by different techniques; these frames 1406-1412 represent the $10^{th}$ frame (e.g., frame 142) in the same description as the lost frame (e.g., frame 122). As shown, frame 1406, which uses the original EC scheme can provide the worst visual quality, since the frames after loss are just decoded as usual without using the additional hypothesis. CMHD with N=2 can improve the quality, but the boundary between the shirt and the coat as shown in frame 1408 can still be ambiguous. Much improvement can be achieved by AMHD as shown in frames 1410 and 1412. Further, as is the case in FIGS. 12 and 13, a longer Time Interval N can help to make the result better. As described herein, the weight of MHD can be fixed for a whole frame; however, it is to be appreciated that block and/or pixel level adaptation can be used to adjust the weight.

Figure 15:
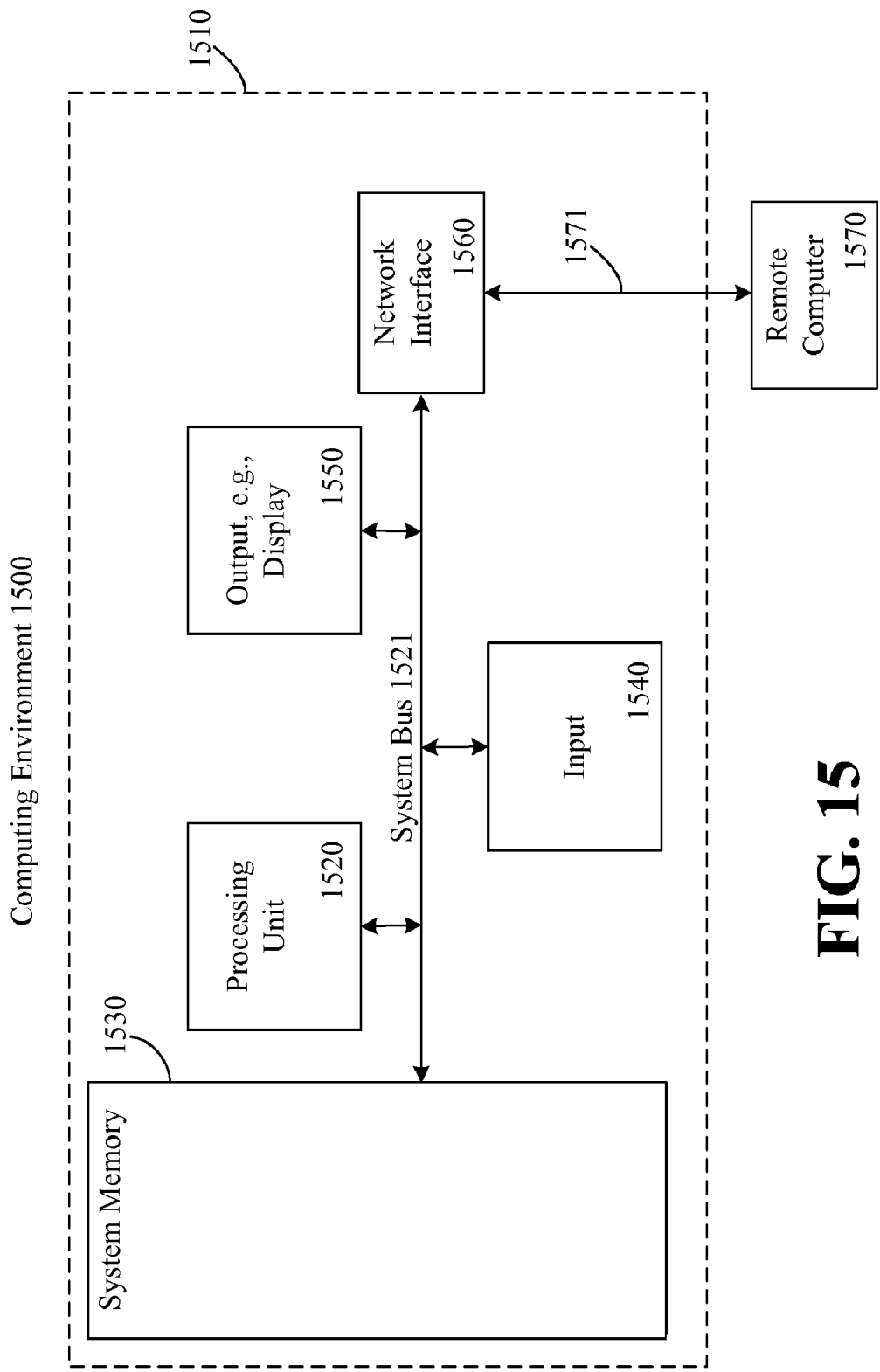
FIG. 15 is a block diagram of an example operating environment in which various aspects described herein can function.

Turning to FIG. 15, an exemplary non-limiting computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a communications system may be desirably configured. Accordingly, the below general purpose remote computer described below in FIG. 15 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as clients, servers, mobile devices, or other devices. Those skilled in the art will appreciate that the claimed subject matter can also be practiced with other computer system configurations and protocols, where non-limiting implementation details are given.

FIG. 15 thus illustrates an example of a suitable computing system environment 1500 in which the claimed subject matter may be implemented, although as made clear above, the computing system environment 1500 is only one example of a suitable computing environment for a media device and is not intended to suggest any limitation as to the scope of use or functionality of the claimed subject matter. Further, the computing environment 1500 is not intended to suggest any dependency or requirement relating to the claimed subject matter and any one or combination of components illustrated in the example operating environment 1500.

With reference to FIG. 15, an example of a remote device for implementing various aspects described herein includes a general purpose computing device in the form of a computer 1510. Components of computer 1510 can include, but are not limited to, a processing unit 1520, a system memory 1530, and a system bus 1521 that couples various system components including the system memory to the processing unit 1520. The system bus 1521 can be any of several types of bus structures including a memory bus or memory controller, a peripheral bus, and a local bus using any of a variety of bus architectures.

Computer 1510 can include a variety of computer readable media. Computer readable media can be any available media that can be accessed by computer 1510. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1510. Communication media can embody computer readable instructions, data structures, program modules or other data in a modulated data signal such as a carrier wave or other transport mechanism and can include any suitable information delivery media.

The system memory 1530 can include computer storage media in the form of volatile and/or nonvolatile memory such as read only memory (ROM) and/or random access memory (RAM). A basic input/output system (BIOS), containing the basic routines that help to transfer information between elements within computer 1510, such as during start-up, can be stored in memory 1530. Memory 1530 can also contain data and/or program modules that are immediately accessible to and/or presently being operated on by processing unit 1520. By way of non-limiting example, memory 1530 can also include an operating system, application programs, other program modules, and program data.

The computer 1510 can also include other removable/non-removable, volatile/nonvolatile computer storage media. For example, computer 1510 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1521 through a non-removable memory interface such as an interface, and a magnetic disk drive or optical disk drive can be connected to the system bus 1521 by a removable memory interface, such as an interface.

A user can enter commands and information into the computer 1510 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1520 through user input 1540 and associated interface(s) that are coupled to the system bus 1521, but can be connected by other interface and bus structures, such as a parallel port, game port or a universal serial bus (USB). A graphics subsystem can also be connected to the system bus 1521. In addition, a monitor or other type of display device can be connected to the system bus 1521 via an interface, such as output interface 1550, which can in turn communicate with video memory. In addition to a monitor, computers can also include other peripheral output devices, such as speakers and/or a printer, which can also be connected through output interface 1550.

The computer 1510 can operate in a networked or distributed environment using logical connections to one or more other remote computers, such as remote computer 1570, which can in turn have media capabilities different from device 1510. The remote computer 1570 can be a personal computer, a server, a router, a network PC, a peer device or other common network node, and/or any other remote media consumption or transmission device, and can include any or all of the elements described above relative to the computer 1510. The logical connections depicted in FIG. 15 include a network 1571, such local area network (LAN) or a wide area network (WAN), but can also include other networks/buses. Such networking environments are commonplace in homes, offices, enterprise-wide computer networks, intranets and the Internet.

When used in a LAN networking environment, the computer 1510 is connected to the LAN 1571 through a network interface or adapter. When used in a WAN networking environment, the computer 1510 can include a communications component, such as a modem, or other means for establishing communications over the WAN, such as the Internet. A communications component, such as a modem, which can be internal or external, can be connected to the system bus 1521 via the user input interface at input 1540 and/or other appropriate mechanism. In a networked environment, program modules depicted relative to the computer 1510, or portions thereof, can be stored in a remote memory storage device. It should be appreciated that the network connections shown and described are exemplary and other means of establishing a communications link between the computers can be used.

Figure 16:
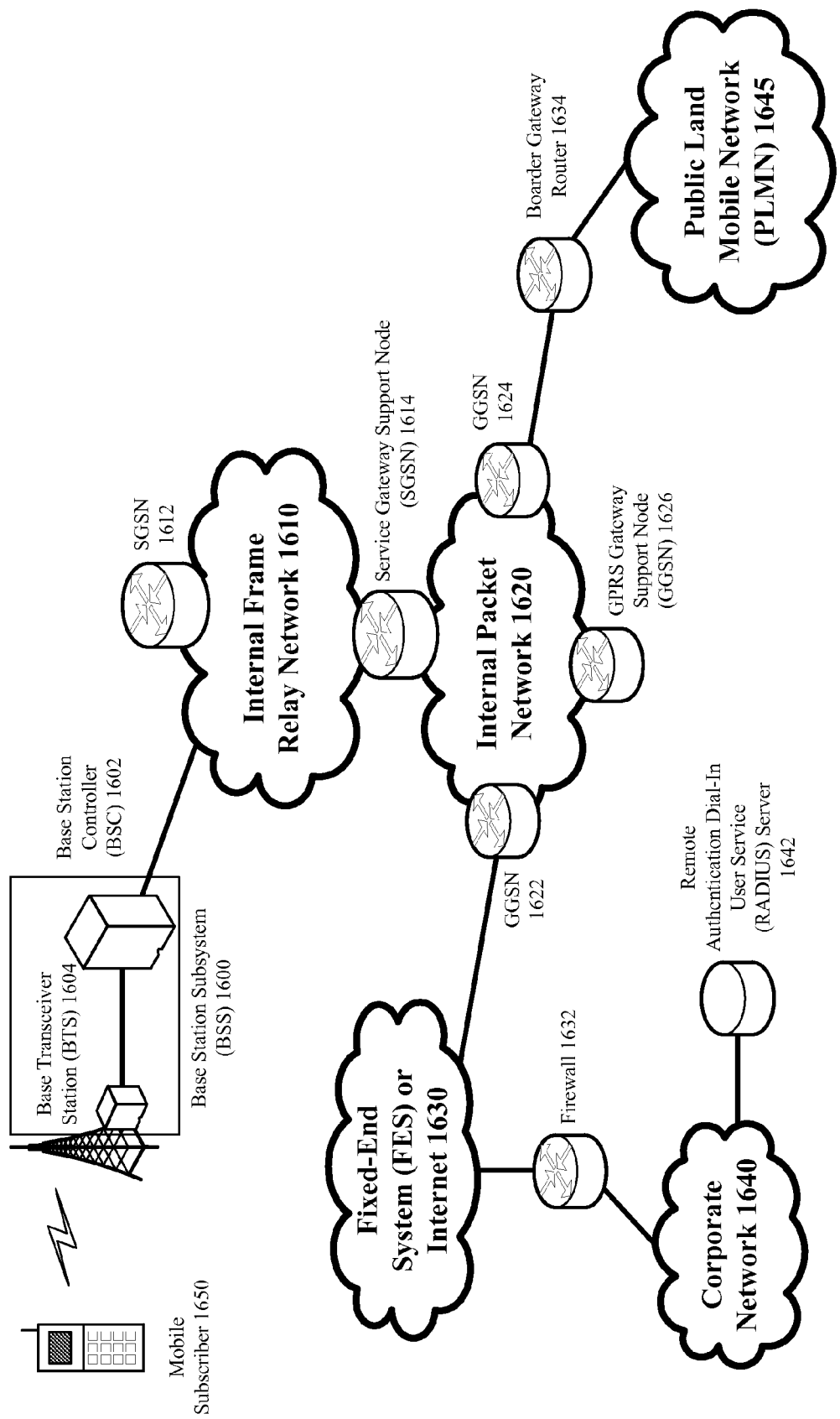
FIG. 16 illustrates an example wireless communication network in which various aspects described herein can be utilized.

Turning now to FIG. 16, an overview of a network environment in which the claimed subject matter can be implemented is illustrated. The above-described systems and methodologies for timing synchronization may be applied to any wireless communication network; however, the following description sets forth an exemplary, non-limiting operating environment for said systems and methodologies. The below-described operating environment should be considered non-exhaustive, and thus the below-described network architecture is merely an example of a network architecture into which the claimed subject matter can be incorporated. It is to be appreciated that the claimed subject matter can be incorporated into any now existing or future alternative architectures for communication networks as well.

FIG. 16 illustrates various aspects of the global system for mobile communication (GSM). GSM is one of the most widely utilized wireless access systems in today's fast growing communications systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the timing synchronization techniques described herein may be applied independently of the method of data transport, and does not depend on any particular network architecture or underlying protocols.

FIG. 16 depicts an overall block diagram of an exemplary packet-based mobile cellular network environment, such as a GPRS network, in which the claimed subject matter can be practiced. Such an environment can include a plurality of Base Station Subsystems (BSS) 1600 (only one is shown), each of which can comprise a Base Station Controller (BSC) 1602 serving one or more Base Transceiver Stations (BTS) such as BTS 1604. BTS 1604 can serve as an access point where mobile subscriber devices 1650 become connected to the wireless network. In establishing a connection between a mobile subscriber device 1650 and a BTS 1604, one or more timing synchronization techniques as described supra can be utilized.

In one example, packet traffic originating from mobile subscriber 1650 is transported over the air interface to a BTS 1604, and from the BTS 1604 to the BSC 1602. Base station subsystems, such as BSS 1600, are a part of internal frame relay network 1610 that can include Service GPRS Support Nodes ("SGSN") such as SGSN 1612 and 1614. Each SGSN is in turn connected to an internal packet network 1620 through which a SGSN 1612, 1614, etc., can route data packets to and from a plurality of gateway GPRS support nodes (GGSN) 1622, 1624, 1626, etc. As illustrated, SGSN 1614 and GGSNs 1622, 1624, and 1626 are part of internal packet network 1620. Gateway GPRS serving nodes 1622, 1624 and 1626 can provide an interface to external Internet Protocol ("IP") networks such as Public Land Mobile Network ("PLMN") 1645, corporate intranets 1640, or Fixed-End System ("FES") or the public Internet 1630. As illustrated, subscriber corporate network 1640 can be connected to GGSN 1622 via firewall 1632; and PLMN 1645 can be connected to GGSN 1624 via boarder gateway router 1634. The Remote Authentication Dial-In User Service ("RADIUS") server 1642 may also be used for caller authentication when a user of a mobile subscriber device 1650 calls corporate network 1640.

Generally, there can be four different cell sizes in a GSM network-macro, micro, pico, and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A system, comprising:
a receiver configured to receive a plurality of streams of encoded video frames, via respective channels; and
a decoder configured to decode the plurality of streams to yield video frames based on the encoded video frames, the decoder includes a reconstruction component configured to reconstruct a first frame in a first stream of the plurality of streams corrupted during transmission with error concealment and reconstruct at least one frame subsequent to the first frame in the first stream based upon multi-hypothesis decoding,
wherein the reconstruction component comprises a multi-hypothesis decoder including
a direct decode component configured to directly decode the at least one frame subsequent to the first frame, the at least one frame directly or indirectly referring to the first frame and
a concealment component configured to reconstruct the at least one frame subsequent to the first frame based at least in part on temporal interpolation and as a function of frames included in a second stream of the plurality of streams.

2. The system of claim 1, wherein the reconstruction component is configured to mitigate error propagation by determination of concealment of the at least one frame subsequent to the first frame as an additional hypothesis used for the multi-hypothesis decoding.

3. The system of claim 1, wherein the reconstruction component further comprises a frame loss detection component configured to identify transmission error associated with the first frame corrupted during the transmission.

4. The system of claim 1, wherein the reconstruction component further comprises a lost frame interpolation component configured to perform the error concealment for the first frame based at least in part on temporal interpolation.

5. The system of claim 4, wherein the lost frame interpolation component is configured to employ at least one of unidirectional motion compensated temporal interpolation, overlapped motion compensated temporal interpolation, modified fast motion compensated temporal interpolation, multiframe optical flow estimation, or three-loop temporal interpolation on the first frame.

6. The system of claim 1, wherein the multi-hypothesis decoder is further configured to generate a weighted sum of outputs from the direct decode component and the concealment component.

7. The system of claim 6, wherein the multi-hypothesis decoder is configured to generate the weighted sum of outputs based on constant weights.

8. The system of claim 6, wherein the multi-hypothesis decoder further comprises an adaptive weighting component configured to adaptively determine weights for combination of outputs from the direct decode component and outputs from the concealment component based on a minimum mean square error criterion.

9. The system of claim 1, further comprising a render component configured to generate a display based upon the video frames.

10. The system of claim 1, wherein the plurality of streams are encoded using multiple description coding with odd or even sub-sampling.

11. The system of claim 1, wherein the multi-hypothesis decoder is further configured to reconstruct four, five, or six frames subsequent to the first frame in the first stream.

12. A method, comprising:
receiving, via multiple channels, multiple video streams corresponding to respective, separately encoded sets of video frames;
determining an error associated with a first frame in a first stream of the multiple video streams when decoding the multiple video streams;
reconstructing the first frame with temporal interpolation using frames surrounding the first frame included in a second stream of the multiple video streams; and
reconstructing one or more frames subsequent to the first frame included in the first stream utilizing multi-hypothesis decoding that combines direct decoding and temporal interpolating,
wherein the multi-hypothesis decoding comprises:
directly decoding a second frame in the second stream that directly or indirectly depends from the first frame in the first stream;
interpolating the second frame utilizing frames surrounding the second frame included in the second stream; and
reconstructing the second frame by generating a weighted sum of the directly decoded second frame and the interpolated second frame as a function of weights.

13. The method of claim 12, wherein the receiving the multiple video streams includes receiving the multiple video streams from an encoder employing odd and even temporal sub-sampling with multiple description coding.

14. The method of claim 12, further comprising adjusting a number of the one or more frames subsequent to the first frame.

15. The method of claim 12,
wherein the reconstructing the second frame includes reconstructing the second frame by generating the weighted sum of the directly decoded second frame and the interpolated second frame using constant weights.

16. The method of claim 15, further comprising selecting the constant weights as a function of a time interval over which the multi-hypothesis decoding is effectuated.

17. The method of claim 12, the multi-hypothesis decoding further comprising:
determining adaptive weights corresponding to the directly decoded second frame and the interpolated second frame based upon a minimum mean square error criterion,
wherein the reconstructing the second frame includes reconstructing the second frame by generating the weighted sum of the directly decoded second frame and the interpolated second frame using the adaptive weights.

18. A non-transitory computer readable storage medium comprising computer executable instructions that, in response to execution of the computer-executable instructions, cause at least one computing device including at least one processor to perform operations, comprising:
obtaining at least two video streams via at least two channels, the at least two video streams correspond to respective, separately encoded sets of video frames yielded from employing odd or even temporal sub-sampling with multiple description coding;
identifying an error associated with a first frame in a first stream of the at least two video streams when decoding the at least two video streams;

reconstructing the first frame with temporal interpolation using frames surrounding the first frame included in a second stream of the at least two video streams; reconstructing one or more frames subsequent to the first frame included in the first stream utilizing multi-hypothesis decoding that combines direct decoding and temporal interpolating, the multi-hypothesis decoding comprising:

directly decoding a second frame in the second stream of the at least two video streams that directly or indirectly depends from the first frame included in the first stream:

interpolating the second frame utilizing frames surrounding the second frame included in the second stream; and reconstructing the second frame including generating a weighted sum of the directly decoded second frame and the interpolated second frame as a function of weights;

decoding at least one of frames prior to the first frame in the first stream, frames in the first stream after the one or more frames, or frames in the second stream; and displaying decoded and reconstructed frames.

* * * * *

UNITED STATES PATENT AND TRADEMARK OFFICE
CERTIFICATE OF CORRECTION

PATENT NO. : 8,254,469 B2
APPLICATION NO. : 12/116731
DATED : August 28, 2012
INVENTOR(S) : Au et al.

It is certified that error appears in the above-identified patent and that said Letters Patent is hereby corrected as shown below:

On Page 2, in Field (56), under "OTHER PUBLICATIONS", in Column 1, Line 3, delete "Inteligent" and insert -- Intelligent --, therefor.

On Page 2, in Field (56), under "OTHER PUBLICATIONS", in Column 2, Line 7, delete "M.-T. Sun" and insert -- M.T. Sun --, therefor.

On Page 2, in Field (56), under "OTHER PUBLICATIONS", in Column 2, Lines 11-29, delete "Wang and Zhu, "Error control and concealment for video communication: a review," in Proc. IEEE, May 1998, pp. 974-997.
Lynch, and Tho, "Joint forward error correction and error concealment for compressed video," in Proc. IEEE ITCC, Apr. 2002, pp. 410-441.
Fu, "Efficient post-compression error-resilient 3D-scalable video transmission for packet erasure channels," in Proc. IEEE ICASSP, Mar. 2005, pp. 305-308.
Wang, "Multiple description coding for video delivery," in Proc. IEEE, Jan. 2005, pp. 57-70.
Tang and Au, "Unidirectional motion compensated temporal interpolation," in Proc. IEEE ISCAS, Jun. 1997, pp. 1444-1447.
Wong and Au, "Fast motion compensated temporal interpolation for video," in Proc. SPIE VCIP, May 1995, pp. 1108-1118.
Farber, "Analysis of error propagation in hybrid video coding with application to error resilience," in Proc. IEEE ICIP, Oct. 1999, pp. 550-554.
Girod and Farber, "Wireless video," in Compressed Video Over Networks, M.-T. Sun and A. R. Reibman, Eds. Marcel Dekker, 2000."

On Page 2, in Field (56), under "OTHER PUBLICATIONS", in Column 2, Lines 30-32, delete "Wang, "Multiple description image coding for noisy channels by pairing transform coefficients," in IEEE MMSP, Jun. 1997, pp. 419-424.".

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 8,254,469 B2

In Column 9, Line 66, delete "$\sigma_c^2 = E\{\psi^c(l_o+2t) - \tilde{\psi}(l_o+2t))^2\}.$" and insert -- $\sigma_c^2 = E\{\psi^c(l_0+2t) - \tilde{\psi}(l_0+2t))^2\}.$ --, therefor.

In Column 12, Line 40, delete "1-frame." and insert -- I-frame. --, therefor.

In Column 13, Line 67, delete "N. CMHD" and insert -- N, CMHD --, therefor.

In Column 17, Line 3, delete "mobile" and insert -- mobile, --, therefor.

In Column 19, Line 9, in Claim 1, delete "frames," and insert -- frames --, therefor.